United States Patent
Gross et al.

(10) Patent No.: US 11,841,234 B1
(45) Date of Patent: Dec. 12, 2023

(54) SYSTEMS AND METHODS FOR GENERATING USER OFFERINGS RESPONSIVE TO TELEMATICS DATA

(71) Applicant: State Farm Mutual Automobile Insurance Company, Bloomington, IL (US)

(72) Inventors: Ryan Michael Gross, Normal, IL (US); Joseph Robert Brannan, Bloomington, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 606 days.

(21) Appl. No.: 16/780,451

(22) Filed: Feb. 3, 2020

Related U.S. Application Data

(60) Provisional application No. 62/892,850, filed on Aug. 28, 2019.

(51) Int. Cl.
*G01C 21/34* (2006.01)
*G06N 5/04* (2023.01)
(Continued)

(52) U.S. Cl.
CPC ..... *G01C 21/3484* (2013.01); *G01C 21/3446* (2013.01); *G01C 21/3492* (2013.01);
(Continued)

(58) Field of Classification Search
CPC ............ G01C 21/3484; G01C 21/3446; G01C 21/3492; G01C 21/3688; G06N 20/00; G06N 5/04
See application file for complete search history.

(56) References Cited

U.S. PATENT DOCUMENTS 9,081,650 B1 * 7/2015 Brinkmann ........... B60W 40/09
9,135,759 B2 9/2015 Baer
(Continued)

FOREIGN PATENT DOCUMENTS

AU 2012100850 A4 7/2012
AU 2012100852 A4 7/2012

OTHER PUBLICATIONS

Kirgios, E.L.; Chang,E.H.; Levine,E.E.; Milkman, K.L.; Kessler,J. B, Forgoing earned incentives to signal pure motives, Proceedings of the National Academy of Sciences of the United States of America, 117(29), 16891-16897, Jul. 21, 2020 (Year: 2020).
(Continued)

*Primary Examiner* — Ramsey Refai
(74) *Attorney, Agent, or Firm* — Armstrong Teasdale LLP

(57) ABSTRACT

A user analytics computing device for processing vehicle-based telematics data and generating user offerings responsive to the vehicle-based telematics data includes at least one processor in communication with a memory device. The processor is programmed to: (i) receive, from a vehicle computing device, telematics data associated with a plurality of trips taken by a first driver using a first vehicle, (ii) generate a driver profile of the first driver based at least in part upon the telematics data, (iii) access, from the memory device, contextual data associated with an environment in which the first vehicle travelled during the plurality of trips, (iv) synthesize the driver profile and the contextual data to generate a contextualized driver profile, (v) based upon the contextualized driver profile, generate a user offering to influence the driver profile, and (vi) transmit the user offering to a user computing device associated with the first driver.

20 Claims, 7 Drawing Sheets

(51) Int. Cl.
  *G01C 21/36* (2006.01)
  *G06N 20/00* (2019.01)
(52) U.S. Cl.
  CPC .......... *G01C 21/3688* (2013.01); *G06N 5/04* (2013.01); *G06N 20/00* (2019.01)

(56) References Cited

U.S. PATENT DOCUMENTS

| | | | |
|---|---|---|---|
| 9,311,271 B2 | 4/2016 | Wright | |
| 9,628,958 B1 | 4/2017 | McBurney | |
| 9,633,487 B2 | 4/2017 | Wright | |
| 9,767,516 B1 | 9/2017 | Konrardy et al. | |
| 9,786,009 B2 | 10/2017 | Schumann, Jr. et al. | |
| 10,192,369 B2 | 1/2019 | Wright | |
| 10,198,879 B2 | 2/2019 | Wright | |
| 10,354,333 B1* | 7/2019 | Hayward | G08G 1/0965 |
| 10,373,257 B1 | 8/2019 | Iqbal et al. | |
| 10,773,727 B1 | 9/2020 | Ivanyi | |
| 11,124,195 B1 | 9/2021 | Gu | |
| 11,312,385 B1 | 4/2022 | Russo | |
| 11,407,370 B2 | 8/2022 | Seger | |
| 11,475,527 B1* | 10/2022 | Leise | G06Q 40/08 |
| 2012/0072244 A1* | 3/2012 | Collins | G06Q 10/10 705/4 |
| 2012/0271690 A1 | 10/2012 | Urban | |
| 2013/0006675 A1 | 1/2013 | Bowne et al. | |
| 2014/0113619 A1* | 4/2014 | Tibbitts | H04W 4/027 455/419 |
| 2014/0195272 A1 | 7/2014 | Sadiq et al. | |
| 2016/0098869 A1 | 4/2016 | Rood | |
| 2017/0140652 A1* | 5/2017 | Hodges | G06F 3/04842 |
| 2019/0143994 A1* | 5/2019 | Chen | B60W 40/09 340/576 |
| 2019/0287180 A1 | 9/2019 | Vartanian et al. | |
| 2020/0074492 A1 | 3/2020 | Scholl | |

OTHER PUBLICATIONS

Peerawil Kongmuang; Natcha, Thawesaengskulthai, Improvement of telematics Solution for Motoer Insurance in Thailand by 5D Innovation Development Process (English), 2019 IEEE 6th International Conference on Industrial Engineering and Applications ICIEA) (pp. 6-11), Apr. 1, 2019 (Year: 2019).

* cited by examiner

SYSTEMS AND METHODS FOR GENERATING USER OFFERINGS RESPONSIVE TO TELEMATICS DATA

CROSS-REFERENCE TO RELATED APPLICATIONS

This application claims the benefit of priority to U.S. Provisional Patent Application No. 62/892,850, filed Aug. 28, 2019, entitled "SYSTEMS AND METHODS FOR GENERATING USER OFFERINGS RESPONSIVE TO TELEMATICS DATA", the entire content and disclosure of which is hereby incorporated by reference herein in its entirety.

FIELD OF THE DISCLOSURE

The present disclosure generally relates to analyzing processing telematics data, and, more particularly, to systems and methods for generating user offerings responsive to telematics data, including vehicle-based and non-vehicle based telematics data.

BACKGROUND

Connected vehicles are vehicles equipped with communications abilities (e.g., vehicle-to-infrastructure (V2I), vehicle-to-vehicle (V2V), and/or vehicle-to-network (V2N) communication). Such vehicles are increasingly common. Connected vehicles are often equipped with a variety of sensors that are potential sources of data (e.g., telematics data) regarding drivers of the connected vehicle and trips taken by the connected vehicle, and/or an environment around the connected vehicle.

Individuals use mobile devices (e.g., mobile telephones) for a variety of purposes and often carry mobile devices while traveling. Such usage may be an additional source of data. For example, mobile devices may be equipped to generate data (e.g., telematics data) using instruments built into the mobile device, such as an accelerometer or global positioning system (GPS) device. This data obtained from connected cars and/or mobile devices may be useful for a variety of applications.

However, there are currently limitations in the ability of computing devices to utilize such data in automated processes. Specifically, vehicle-based and/or phone-based telematics data may need to be reconciled by human beings to be used in various applications, which may result in lack of timeliness, inaccuracies, inconvenience, and/or other drawbacks.

BRIEF SUMMARY

The present embodiments may relate to, inter alia, systems and methods for generating user offerings responsive to telematics data. Based upon the type of telematics data received from a user, the systems described herein may develop a profile of user behavior. Based further upon contextual data, which includes data not specific to the user but descriptive of the environment around the user at the time the telematics data was captured, the system may modify the profile of the user behavior and/or generate a user offering to influence the user's behavior (and, therefore, their profile). The user offering may be a recommendation, an incentive, a discount, and the like.

In one aspect, a user analytics computing device for processing vehicle-based telematics data and generating user offerings responsive to the vehicle-based telematics data may be provided. The user analytics computing device may include at least one processor (and/or associated transceiver) in communication with a memory device. The at least one processor and/or associated transceiver may be programmed to: (i) receive, from a vehicle computing device associated with a first vehicle, telematics data associated with a plurality of trips taken by a first driver using the first vehicle, (ii) generate a driver profile of the first driver based at least in part upon the telematics data, (iii) access, from the memory device, contextual data associated with an environment in which the first vehicle travelled during the plurality of trips, (iv) synthesize the driver profile and the contextual data to generate a contextualized driver profile, (v) based upon the contextualized driver profile, generate a user offering to influence the driver profile, and/or (vii) transmit the user offering to a user computing device associated with the first driver. The user analytics computing device may include less, additional, and/or alternative functionality, including that described herein.

In another aspect, a computer-implemented method for processing vehicle-based telematics data and generating user offerings responsive to the vehicle-based telematics data may be provided. The method may be implemented by a user analytics computing device including at least one processor (and/or associated transceiver) in communication with a memory device. The method may include, via the processor and/or associated transceiver: (i) receiving, from a vehicle computing device associated with a first vehicle, telematics data associated with a plurality of trips taken by a first driver using the first vehicle, (ii) generating a driver profile of the first driver based at least in part upon the telematics data, (iii) accessing, from the memory device, contextual data associated with an environment in which the first vehicle travelled during the plurality of trips, (iv) synthesizing the driver profile and the contextual data to generate a contextualized driver profile, (v) based upon the contextualized driver profile, generating a user offering to influence the driver profile, and/or (vi) transmitting the user offering to a user computing device associated with the first driver. The method may include fewer, additional, and/or alternative steps, include those described herein.

In a further aspect, a non-transitory computer-readable storage medium having computer-executable instructions embodied thereon may be provided. When executed by a user analytics computing device having at least one processor (and/or associated transceiver) in communication with at least one memory, the computer-executable instructions may cause the at least one processor and/or associated transceiver to: (i) receive, from a vehicle computing device associated with a first vehicle, telematics data associated with a plurality of trips taken by a first driver using the first vehicle, (ii) generate a driver profile of the first driver based at least in part upon the telematics data, (iii) access, from the memory device, contextual data associated with an environment in which the first vehicle travelled during the plurality of trips, (iv) synthesize the driver profile and the contextual data to generate a contextualized driver profile, (v) based upon the contextualized driver profile, generate a user offering to influence the driver profile, and/or (vi) transmit the user offering to a user computing device associated with the first driver. The computer-executable instructions may provide additional, less, and/or alternative functionality, including that described herein.

In yet another aspect, a user analytics computing device for processing mobile device telematics data and generating user offerings responsive to the mobile device telematics data may be provided. The user analytics computing device may include at least one processor (and/or associated transceiver) in communication with a memory device. The at least one processor and/or associated transceiver may be programmed to: (i) form a first group including a first user and a second user, (ii) receive, from a first mobile device associated with the first user, first telematics data associated with movement of the first user over a period of time, (iii) parse, from the first telematics data, subsets of the first telematics data, each subset of the first telematics data associated with a respective travel mode of the first user during the period of time, (iv) receive, from a second mobile device associated with the second user, second telematics data associated with movement of the second user over the period of time, (v) parse, from the second telematics data, subsets of the second telematics data, each subset of the second telematics data associated with a respective travel mode of the second user during the period of time, (vi) retrieve at least one eligibility condition that defines eligibility for the first group to qualify for a user offering, wherein at least one of the eligibility conditions is associated with a first travel mode, (vii) aggregate one subset of the first telematics data associated with the first travel mode of the first user and one subset of the second telematics data associated with the first travel mode of the second user into first group telematics data associated with the first travel mode, (viii) determine whether the first group telematics data satisfies the at least one eligibility condition, and/or (ix) when the first group telematics data satisfies the at least one eligibility condition, compare the first group telematics data to a plurality of other group telematics data associated with a respective plurality of other groups to determine whether the first group has won the user offering. The user analytics computing device may include less, additional, and/or alternative functionality, including that described herein.

In another aspect, a computer-implemented method for processing mobile device telematics data and generating user offerings responsive to the mobile device telematics data may be provided. The method may be implemented using a user analytics computing device including at least one processor (and/or associated transceiver) in communication with a memory device. The method may include, via the processor and/or associated transceiver: (i) forming a first group including a first user and a second user, (ii) receiving, from a first mobile device associated with the first user, first telematics data associated with movement of the first user over a period of time, (iii) parsing, from the first telematics data, subsets of the first telematics data, each subset of the first telematics data associated with a respective travel mode of the first user during the period of time, (iv) receiving, from a second mobile device associated with the second user, second telematics data associated with movement of the second user over the period of time, (v) parsing, from the second telematics data, subsets of the second telematics data, each subset of the second telematics data associated with a respective travel mode of the second user during the period of time, (vi) retrieving at least one eligibility condition that defines eligibility for the first group to qualify for a user offering, wherein at least one of the eligibility conditions is associated with a first travel mode, (vii) aggregating one subset of the first telematics data associated with the first travel mode of the first user and one subset of the second telematics data associated with the first travel mode of the second user into first group telematics data associated with the first travel mode, (viii) determining whether the first group telematics data satisfies the at least one eligibility condition, and/or (ix) when the first group telematics data satisfies the at least one eligibility condition, comparing the first group telematics data to a plurality of other group telematics data associated with a respective plurality of other groups to determine whether the first group has won the user offering. The method may include fewer, additional, and/or alternative steps, include those described herein.

In a further aspect, a non-transitory computer-readable storage medium having computer-executable instructions embodied thereon may be provided. When executed by a user analytics computing device having at least one processor (and/or associated transceiver) in communication with at least one memory, the computer-executable instructions may cause the at least one processor and/or associated transceiver to: (i) form a first group including a first user and a second user, (ii) receive, from a first mobile device associated with the first user, first telematics data associated with movement of the first user over a period of time, (iii) parse, from the first telematics data, subsets of the first telematics data, each subset of the first telematics data associated with a respective travel mode of the first user during the period of time, (iv) receive, from a second mobile device associated with the second user, second telematics data associated with movement of the second user over the period of time, (v) parse, from the second telematics data, subsets of the second telematics data, each subset of the second telematics data associated with a respective travel mode of the second user during the period of time, (vi) retrieve at least one eligibility condition that defines eligibility for the first group to qualify for a user offering, wherein at least one of the eligibility conditions is associated with a first travel mode, (vii) aggregate one subset of the first telematics data associated with the first travel mode of the first user and one subset of the second telematics data associated with the first travel mode of the second user into first group telematics data associated with the first travel mode, (viii) determine whether the first group telematics data satisfies the at least one eligibility condition, and/or (ix) when the first group telematics data satisfies the at least one eligibility condition, compare the first group telematics data to a plurality of other group telematics data associated with a respective plurality of other groups to determine whether the first group has won the user offering. The computer-executable instructions may provide additional, less, and/or alternative functionality, including that described herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
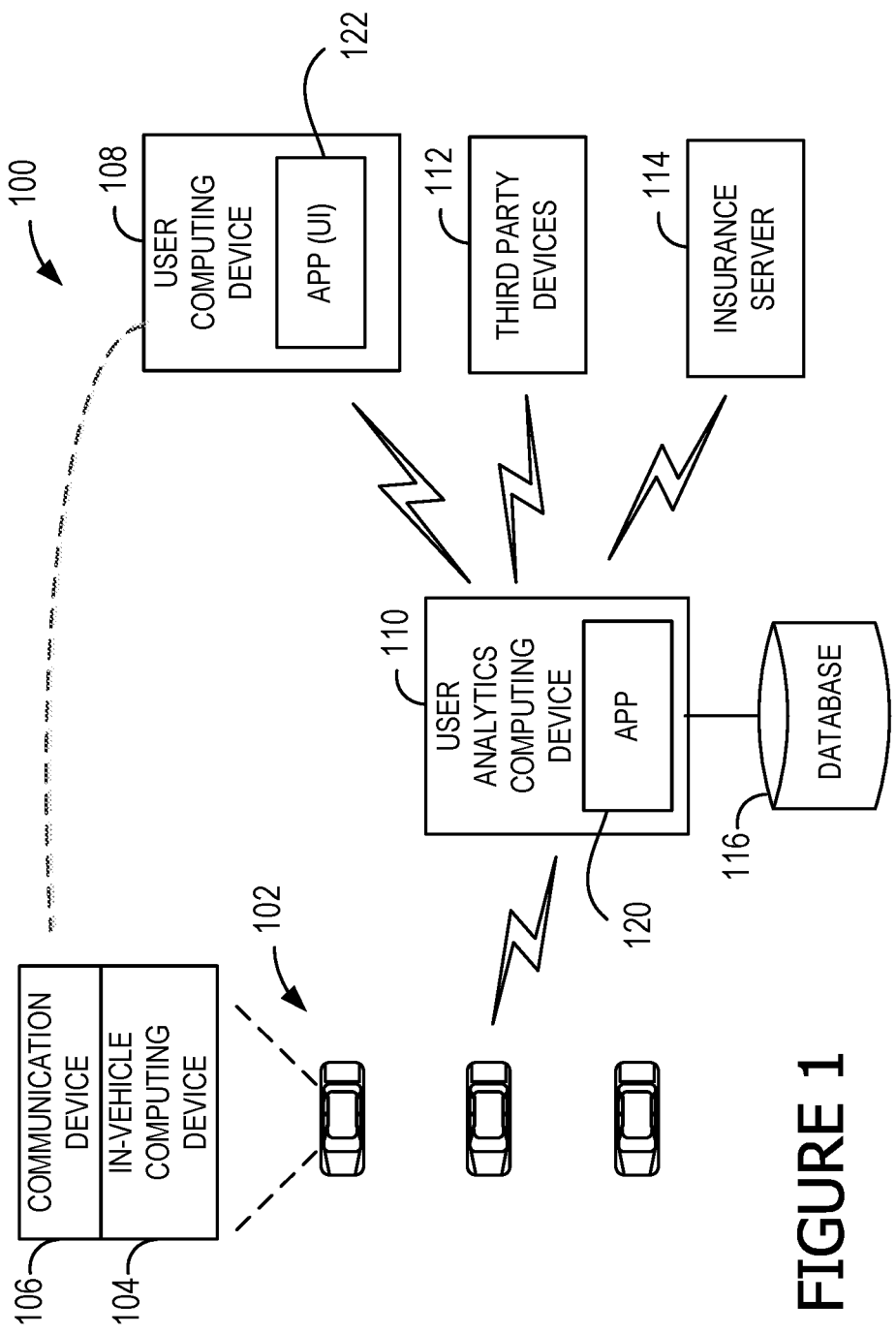
FIG. 1 illustrates a schematic diagram of an exemplary computer system including a user analytics computing device in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for generating user offerings responsive to telematics data. In particular, a computer system may include a user analytics computing device configured to receive, process, and synthesize data from a plurality of sources to offer users recommendations, incentives, and the like, to change their behavior (e.g., to reduce risk, to encourage alternative forms of transportation, etc.). The user analytics computing device may receive, for example, telematics data from a user device (e.g., a mobile telephone, a vehicle-based computing device, etc.). Based upon the type of telematics data received from a user, the systems described herein may develop a profile of user behavior. Based further upon contextual data, which includes data not specific to the user but descriptive of the environment around the user at the time the telematics data was captured, the system may modify the profile of the user behavior and/or generate a user offering to influence the user's behavior (and, therefore, their profile).

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, user-driven or user-operated vehicles, industrial vehicles (e.g., construction vehicles), "riding" lawnmowers, farm equipment, planes, helicopters, bicycles, flying cars, robo-taxis, self-driving taxis, and/or any kind of land-, water-, or air-based vehicle.

"Vehicle user," as used herein, may refer generally to a person who is responsible for the vehicle, and who has access to use of the vehicle. Vehicle users may include owners, lessors, and/or renters, for example, of a vehicle. Vehicle users may be personal vehicle users (e.g., may be responsible for and have access to one or more vehicles for personal use) and/or may be corporate vehicle users (e.g., corporate managers who may be responsible for and have access to one or more vehicles associated with corporate use and/or with a corporate entity).

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane-keep assist systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

"App," as used herein, may refer generally to a software application installed and downloaded on a user computing device and executed to provide an interactive graphical user interface at the user computing device. An app associated with the computer system, as described herein, may be understood to be maintained by the computer system and/or one or more components thereof. Accordingly, a "maintaining party" of the app may be understood to be responsible for any functionality of the app and may be considered to instruct other parties/components to perform such functions via the app.

"Telematics data," as used herein, may refer generally to data associated with monitoring a moving computing device. Telematics data incorporates location, movement (e.g., speed, direction, acceleration, etc.), and condition (e.g., "on", "off", in-motion, etc.) data based upon a plurality of sensors on-board the computing device and/or connected to the computing device. Accordingly, where the computing device is associated with a vehicle, the telematics data may be associated with monitoring the vehicle. Where the computing device is a personal mobile computing device, such as a smart phone, the telematics data may be associated with monitoring the personal mobile computing device. In at least some cases, the personal mobile computing device may be used to capture vehicle telematics data, where the personal mobile computing device is present in/on a vehicle during motion/use of the vehicle.

"Sensor data," as used herein, may refer generally to data captured by sensors that is not necessarily associated with the movement of a computing device. For example, sensor data for a vehicle may include data that captures movement of occupants of the vehicle, which may not affect the motion of the vehicle. In some cases, telematics data may include sensor data, where data is sent in packets that include data from all sensors associated with a computing device (e.g., both motion and non-motion sensor data).

"Contextual data," as used herein, may refer generally to includes data not specific to the user but descriptive of the environment around and/or associated with the user at the time the telematics data (and/or sensor data) was captured. Contextual data may include ambient data (e.g., weather data, traffic data, market data), data associated with other computing devices or vehicles, policy data (e.g., posted speed limits, road closures, detours, etc.), cost data (e.g., gas prices, insurance policy premiums, maintenance costs, etc.), and the like. In some cases, contextual data is accessed from one or more third-party sources. Additionally or alternatively, contextual data is collected from sensors on one or more computing devices within the computer system described herein (e.g., user computing devices).

"Usage-based insurance," as used herein, may refer generally to insurance policies based upon a user's particular usage or performance of one or more covered behaviors. For example, a usage-based policy associated with a user's travel may have certain charges or premiums associated with various types of travel (e.g., personal auto travel, public transportation, ride-sharing, biking, etc.). The cost of the policy may depend on how much the user uses each of those types of travel within a given time period (e.g., per month, per year, etc.). "On-demand insurance," as used herein, may refer generally to insurance policies or add-ons that only activate under certain conditions. For example, additional coverage may be requested or purchased for certain trips a user plans to take.

EXEMPLARY EMBODIMENTS

In the exemplary embodiment, a computer system is configured to leverage telematics data to generate improved user offerings, based upon a user's behavior as indicated in the telematics data. The telematics data may be received from a plurality of sources, including a user's mobile device and/or one or more connected vehicles. Additionally or alternatively, the computer system may receive and analyze additional data, such as sensor data and/or contextual data, to generate the user offerings. In the exemplary embodiment, the computer system may capture and synthesize this data, leveraging machine learning and/or artificial intelligence, to generate and provide user offerings that may save a user money, reduce a user's risk, provide incentives and rewards, and the like.

In some embodiments, the computer system may receive, retrieve, capture, and/or otherwise access telematics data, sensor data, contextual data, and/or additional or alternative data from a user's mobile device, one or more connected vehicles, and/or one or more third-party or external sources. The computer system may include any suitable data storage capabilities, such as cloud storage, to access and/or store any of the above data. In that way, the computer system may access and analyze historical and/or current (e.g., real-time or near real-time) data. In the exemplary embodiment, the computer system includes at least one user analytics computing device. The user analytics computing device is configured to perform the functions that may be more generally described herein as being performed by and/or attributed to the overall computer system.

In particular, in the exemplary embodiment, the user analytics computing device may be in communication with one or more computing devices associated with a user. These computing devices may include a personal mobile computing device, such as a smart phone, tablet, and the like. These computing devices may additionally or alternatively include a vehicle computing device associated with a personal vehicle of the user (e.g., a vehicle that the user drives or operates, which may be a non-autonomous, semi-autonomous, and/or autonomous vehicle). A vehicle computing device may include a computing device integral to the vehicle and/or a personal mobile computing device that is in, on, or otherwise associated with the vehicle while the vehicle is operating.

The user analytics computing device may receive data from the computing device(s), including telematics data associated with motion of the user, sensor data, contextual or environmental data, and/or any other type of data. The user analytics computing device may receive portions of such data from alternative computing devices, such as third-party computing devices. Additionally or alternatively, the user analytics computing device may access portions of such data from one or more databases or other memory devices. That is, the user analytics computing device need not receive data in "real-time" in order to perform the methods described herein, but may receive data in "real-time."

The user analytics computing device may be configured to aggregate, combine, synthesize, parse, compare, and/or otherwise process this data, as described in more detail herein, in order to (i) build profiles reflective of user behavior, such as driving behavior, travel behavior, and the like, and/or (ii) generate user offerings based upon those profile, where the user offerings are designed to influence and/or affect future user behavior, which may, in turn, influence and/or affect the profiles.

The user analytics computing device may store any received, retrieved, and/or accessed data in one or more databases, and may store any profiles, user offerings, and/or other generated data in the one or more databases. A database may be any suitable storage location, and may in some embodiments include a cloud storage device such that the database may be accessed by a plurality of computing devices (e.g., a plurality of user analytics computing devices, insurance computing devices, third-party computing devices, etc.). The database may be integral to the user analytics computing device or may be remotely located with respect thereto.

In one exemplary embodiment, a user offering may include a recommendation or notification intended to influence a user's behavior (e.g., reduce risk associated with the user's behavior). For example, the user offering may include a recommendation or notification to the user regarding the user's driving habits.

As used herein, a user's profile, or more particularly, a user's "driving profile" is a summary, aggregation, and/or general description of a user's driving behavior. The user analytics computing device may develop or generate the driving profile over time, based upon telematics data and/or sensor data associated with one or more trips the user has taken in which the user was the driver. The driving profile may therefore include data associated with how the user drives (e.g., speed, acceleration, braking, cornering, following distance), where the user drives (e.g., "common" routes), when the user drives (e.g., "common" commute times), and the like. The driving profile may include average values, maximum values, minimum values, weight averages, median values, ranges, and other quantitative measures of the user's driving behavior. The driving profile may also include non-quantitative elements, such as locations, routes, and the like.

The user analytics computing device may access, receive, and/or retrieve contextual data that the user analytics computing device can leverage to contextualize the generated driver profile, or generate a "contextualized driving profile." In particular, the contextualized driving profile incorporates data external to the user's behavior that may influence or affect the user's behavior into the driving profile. For example, contextual data may include posted speed limit data at locations or along routes the user where the user travels.

The user analytics computing device may synthesize this contextual data with the driving profile (e.g., objective data about the user's driving speed) to generate the contextualized driving profile that includes indicators of whether the user follows or sometimes exceeds posted speed limits. For instance, the contextualized driving profile may include a numeric value or score that indicates how often the user exceeds the speed limit (e.g., 30% of the time) or to what extent the user exceeds the speed limit (e.g., an average of 5 MPH over the posted speed limit, or an average of 10% over the posted speed limit). Additionally or alternatively, the contextualized driving profile may include a qualitative indicator, such as "occasionally exceeds the speed limit."

Continuing with the above example, the user analytics computing device may incorporate additional contextual data, such as sensor data associated with the behavior of other vehicles, into the contextualized driving profile. For instance, the contextualized driving profile may indicate the user frequently exceeds the speed limit by 10 MPH during a particular portion of their morning commute (e.g., a route frequently travelled at the same time every weekday). However, upon incorporating data associated with other vehicles travelling at the same location at the same time, the user analytics computing device determines that the user travels at an average or comparatively low speed, relative to other drivers on the road. Accordingly, the user analytics computing device may update the contextualized driving profile to reflect that the driver travels at a "normal," "average," "acceptable," or "standard" speed, or some other designation.

As another example, contextual data may include information associated with a common or frequently travelled route. As used herein, a "common" route may include a route the user travels more than a threshold number of times within a certain duration (e.g., within a week, month, or year) and/or a route the user travels with a defined periodicity (e.g., every weekday morning, every Tuesday evening, etc.). The user analytics computing device may identify common routes using telematics data from the user's mobile device and/or connected vehicle. In some instances, the contextual data associated with a common route may include, for example, traffic data, traffic light timing data, weather data, and the like. Traffic data may be provided by a third party (e.g., WAZE or GOOGLE) and/or may be determined based upon sensor and/or telematics data from a plurality of connected vehicles. Traffic light timing data may be provided by a third party (e.g., by a representative of a city or metro area) and/or may be determined based upon sensor and/or telematics data from one or more connected vehicle (e.g., using image/video data captured by on-board cameras while the vehicle(s) travel along the common route).

The user analytics computing device may synthesize this contextual data with the driving profile (e.g., the user's common routes, the time(s) the common routes are travelled, the user's speed along the common route, etc.) to generate a contextualized driving profile that includes a model of the user's travel along the common route. In particular, the user analytics computing device may train a machine learning model using the user's driving behavior over a period of time (e.g., one week, two weeks, one month, etc.) such that the model learns the user's common routes, when the user travels along the common routes, how the user travels along the common route (e.g., average speed overall, average speed along certain portions of the route, number of stops, etc.) and how the contextual data (e.g., traffic, traffic lights, weather) affects the user's travel or driving behaviors.

In another exemplary embodiment, the user analytics computing device may be configured to use the trained model to predict potential (future) travel for the user. For instance, the user analytics computing device may use the trained model to predict the user will travel along Route A (e.g., a commute route) on Monday morning. The user analytics computing device may use the trained model and contextual data, including historical and current contextual data, to model various iterations of the user's potential travel, based upon when the user initiates travel along Route A. For example, the user analytics computing device may use the trained model to predict the user's travel along Route A if the user leaves at 6:50, 6:57, 7:01, 7:05, 7:13, 7:15, etc. Additionally or alternatively, the user analytics computing device may use the trained model and contextual data to model various iterations of the user's potential travel along variations of Route A, such as using alternative streets during portions of Route A.

The user analytics computing device may use the output from the trained model to identify a most efficient route. The most efficient route may include the route in which the user encounters the fewer number of red lights, the route in which the user is stopped or slowed by traffic the least, and/or the fastest route. The trained model may generate routes, including the most efficient routes, based at least in part upon the user's typical speed along the common route and/or the posted speed limit along the common route. In some instances, the most efficient route includes travel at the posted speed limit.

Based upon the user's driving profile and/or contextualized driving profile, the user analytics computing device may generate user offerings for the user that may influence the driver's behavior. In one particular embodiment, the user analytics computing device may generate a user offering including a notification of the costs associated with the user's driving behavior and a recommendation for reducing those costs based upon a proposed change to the user's driving behavior. The user analytics computing device may access contextual data including cost data.

The cost data may be associated with a particular vehicle, such as the driver's vehicle. For example, the cost data may be associated with gas mileage data for the make, model, and/or year of the driver's vehicle. The cost data may also include geography-dependent costs, such as the cost of gas, vehicle maintenance, and/or vehicle repair in the user's geographic area. The cost data may also include costs specific to the user, such as an insurance premium for an insurance policy associated with the user's vehicle. In some cases, the contextual data may include additional geography-dependent data, such as available public transportation (e.g., buses, trains, streetcars, etc.) and/or other alternative forms of transportation (e.g., taxis, ride-sharing, bike rentals or bike-sharing, scooters, etc.).

The user analytics computing device may be further configured to synthesize this contextual data with the user's driving profile and/or existing contextualized driving profile to calculate costs associated with the user's driving behavior. For instance, the user analytics computing device may calculate the gas costs associated with the user's average driving behavior, which is 3-5 MPH over a posted speed limit. The user analytics computing device may additionally or alternatively calculate estimated maintenance costs associated with this driving behavior. The user analytics computing device may therefore generate a user offering including a recommendation that the user decrease their average speed by 3-5 MPH and a notification that such a behavior change could result in a savings of the above-described costs.

The user offering may further include an incentive for following the recommendation, such as a reduction in the user's insurance premium or an associated discount. Accordingly, the user may both reduce their overall risk (e.g., by reducing their driving speed) and save money (e.g., by reducing their gas costs and/or receiving the incentive).

In another embodiment, the user analytics computing device may generate a user offering including a notification of the identified most efficient route, as described above, and a recommendation of the optimal travel initiation time (i.e., the time at which to initiate travel along the most efficient route). The travel initiation time may be a specific minute or may be a window of time (e.g., up to five minutes). In some embodiments, there may be a plurality of travel initiation times that enable the user to access the most efficient route, such as a plurality of windows of time throughout an hour. The user analytics computing device may transmit the user offering to the user for display within the app and/or using any other notification format (e.g., text message, email, push notification) at a time preceding the travel initiation time, such as a day or an hour preceding the travel initiation time.

In some instances, the user offering may further include a recommendation that the user maintain speed at a particular speed along one or more portions of the most efficient route (e.g., no more than a posted speed limit) to take advantage of the most efficient route. That is, travelling too fast (e.g., above the posted speed limit) may cause the user to "catch up" to red lights or other traffic, which reduces the efficiency of the most efficient route. In some instances, the user offering may also include an incentive for following the recommendation, such as a reduction in the user's insurance premium or an associated discount. Specifically, initiating travel along the most efficient route at the optimal travel initiation time may reduce a user's overall driving risk, as less "stop and go" traffic reduces the risk of collisions and/or the user may reduce their travelling speed. Accordingly, the user may both reduce their overall risk and save money (e.g., by receiving the incentive).

In some embodiments, the user analytics computing device generates the user offering based upon historical data, that is, based upon the user's past driving behavior. In some such embodiments, the user analytics computing device may transmit the user offering to the user once, for example, in response to a request from the user or in response to determining that the user is eligible for the user offering (e.g., based upon the user's driving profile and/or contextualized driving profile). The user analytics computing device may transmit the user offering to the user within the user analytics app. The app may display the user offering to the user as a report or document that includes the recommendation and/or the notification. In some embodiment, the report includes additional information, such as a total savings amount over a period of time (e.g., if the recommendation is followed).

In other embodiments, the user analytics computing device may generate and/or transmit user offerings in real-time, that is, based upon the user's current driving behavior (which may be compared to past behavior based upon a previously generated driving profile and/or which may be based upon telematics data, sensor data, and/or contextual data received and/or otherwise accessed in real-time). In some such embodiments, the user analytics computing device may transmit the user offering to the user in the form of alerts (e.g., within the app, as a text message or push notification, etc.). The alerts may identify the user's current behavior (e.g., exceeding a posted speed limit) and may include the recommendation to modify the user's driving behavior (e.g., "reduce your speed to the posted speed limit"). In some embodiments, the alert may also include an incentive, as described above, which may be a monetary incentive (e.g., "maintain your speed to the posted limit to receive a discount on your insurance premium" or "reduce your speed to the posted limit to avoiding hitting additional red lights"). Additionally or alternatively, the alerts may include contextual data (e.g., "There is traffic ahead. Adjust your route by [taking a particular action, such as slowing down or taking an alternative route] to maintain efficiency.").

Additionally or alternatively, the user analytics computing device may identify, based upon the contextual data, one or more alternative forms of transportation available to the user. The user analytics computing device may model, using artificial intelligence, potential transportation options for the user that incorporate at least one of these alternative forms of transportation, and may calculate the cost(s) associated therewith. If such costs are lower than costs calculated by the user analytics computing device for the user's typical behavior (e.g., commuting to and from work in their personal vehicle), the user analytics computing device may generate a user offering include a recommendation that the user incorporate the alternative form(s) of transportation and a notification that such a behavior change could results in a savings. The user offering may further include an incentive for following the recommendation, such as a reduction in the user's insurance premium or an insurance discount (e.g., because the user will be driving less and therefore has a reduced driving risk) and/or an alternative premium associated with an alternative policy (e.g., an on-demand personal mobility policy associated with alternative forms of transportation). Accordingly, the user may both reduce their overall risk (e.g., by driving less) and save money (e.g., by reducing their transportation costs and/or receiving the incentive).

In the exemplary embodiment, the user analytics computing device may be further configured to monitor subsequent user data to determine how a user has responded to a user offering. The user analytics computing device may receive telematics data, sensor data, and/or response data (e.g., selections, commands, and/or other responses actively input by the user) from the vehicle and/or the user's user computing device, from a period of time subsequent to the transmission of the user offering to the user. For example, the user analytics computing device may request, receive, retrieve, and/or otherwise access this subsequent user data for fifteen minutes, one hour, two hours, one day, one week, etc., after the user offering was transmitted to the user. The user analytics computing device may implement any of the above-described methods to analyze the subsequent user data to determine how the user responded to the transmitted user offering.

For example, where a user offering is a recommendation that the user change their driving behavior (e.g., reduce their average speed over a route or during a portion of a route), the user analytics computing device may monitor subsequent telematics data associated with the user's vehicle speed. The user analytics computing device may determine whether the user followed the recommendation and, further to the above example, reduced their speed. Moreover, where such a recommendation includes an incentive, the user analytics computing device may cause the incentive to be applied and/or may confirm to the user that the user's behavior earned the incentive. For instance, in the case of a reduced insurance premium, the user analytics computing device may transmit instructions to an insurance server to apply a discount to the user's insurance premium based upon the user's reduced driving speeds.

Where the incentive was passive, such as reduced gas costs, the user analytics computing device may further request, receive, retrieve, and/or otherwise access user data to confirm whether the incentive was earned. For instance, the user analytics computing device may determine that the user's vehicle consumed less gas and/or the user spent less money on gas during the period of time over which the user reduced their speed. The user analytics computing device may transmit a confirmation message to the user's computing device indicating the user successfully earned an incentive based upon following a recommendation.

In another exemplary embodiment of the present disclosure, the user offering may be a charitable incentive responsive to the user's telematics data satisfying one or more eligibility conditions. The telematics data may be received from the user's mobile device and may be indicative of a mode of travel of the user, including driving (e.g., driving their own personal vehicle), riding one or more forms of mobile transportation (e.g., buses, trains, planes, streetcars, bikes, scooters, etc.), and/or unassisted movement of the user (e.g., walking, jogging, running—movement not assisted by a transportation apparatus; notably, for a user that uses a mobility device, such as a wheelchair, such movement is considered "unassisted" for the purposes of the present disclosure). The charitable incentive is an amount of money to be gifted to a charitable organization on behalf of one or more users that "earn" the charitable incentive based upon their behavior, as represented by their telematics data.

Moreover, the user may be aggregated with other users into a group, and the "group telematics data" (i.e., the aggregated telematics data of all users in the group) may be considered against the eligibility conditions. A plurality of groups may compete against each other to earn the charitable incentive for a specific charitable organization selected by the winning group.

The charitable incentive may be associated with one or more eligibility conditions, which may be input to the user analytics computing device by an administrator. Some eligibility conditions may include instructions or requests associated with particular modes of transportation. For instance, one eligibility condition may include "take a public bus at least twice over the next week," while another may include "ride a bike to work tomorrow." The eligibility conditions may be associated with a particular mode (or modes) of transportation, a number of minutes or distance over which the mode of transportation is to be used, a period of time over which the eligibility condition is active or available, and/or other factors.

Additionally or alternatively, the eligibility conditions may be associated with a user's behavior using a particular mode of transportation. For example, one eligibility condition may be a "safe driving" condition, in which users' telematics data is analyzed for safe driving characteristics (e.g., slower acceleration, softer braking, safer cornering) and assigned an objective score. The group with the best average (or weighted average) "safe driving" score may earn the charitable incentive. As another example, one eligibility condition may be associated with a number of "active" miles, including miles biked, walked, run, or jogged. The group with the highest number of "active" miles (or highest average "per capita" mileage) may earn the charitable incentive.

In some cases, group telematics data (e.g., the aggregated telematics data for all member users within a group) may not compared directly with other group telematics data to determine a winner of a charitable incentive. For example, meeting certain criteria or milestones (e.g., a number of total miles walked or a number of bicycle rides) may count towards "entries" into a lottery-style competition. In such an example, a winning group is chosen at random, but groups with high participation rates may increase their chances of winning.

The user analytics computing device may notify the user of the eligibility condition(s) via the app. Some eligibility conditions may further require the user to activate their app during the requested activity and/or to "log" their activities in order to transmit their telematics data to the user analytics computing device for consideration.

The user analytics computing device may be configured to parse telematics data associated with each different travel mode based upon received telematics data from a user computing device. In some embodiments, the user analytics computing device may leverage artificial intelligence and/or machine learning capabilities to determine which travel mode a user was using at any time. For example, certain models may be trained to recognize different travel modes based upon a speed or pace of the user, a location of the user during travel (e.g., within a park that does not allow vehicles), a distance travelled by the user, and/or a time of travel. Additionally or alternatively, the user analytics computing device may receive, retrieve, request, and/or access other data to determine and/or confirm a particular mode of travel. For example, the user analytics computing device may be configured to leverage data from rental applications executed on a user computing device (e.g., bike rentals, scooter rentals, etc.) to determine and/or confirm a user's travel mode.

In some embodiments, available or active eligibility conditions may vary based upon geographic location, group size, and the like. For instance, eligibility conditions that encourage alternative modes of transportation to driving may be available in larger cities where such alternative modes of transportation are more readily available to users. As another example, groups of a smaller size may only compete against groups of a similar size for the same charitable incentive, and larger groups may only compete against larger groups. In such examples, the eligibility condition for the smaller groups may be separate from the eligibility condition for the larger groups.

Groups may be formed in a variety of different ways. Groups may be location-based, such as a group including members from a same city or same neighborhood. Groups may be formed based upon a shared charitable organization. For instance, a user may register with the user analytics computing device to participate, and may select a particular charitable organization they wish to compete for. That user may be designated as part of a group of users competing for the same charitable organization, regardless of physical location. Groups may be self-designated, such as a group of people that choose to form a group together, or may be designated by user analytics computing device, for users that do not specify a group they wish to join. Groups may include a specific number of users to compete for certain charitable incentives (e.g., a 50-100 person group) or may have any number of users.

In these embodiments, the user analytics computing device generates the user offering based upon which group has earned the charitable incentive (e.g., by meeting the eligibility condition and exceeding all other competing groups). The user analytics computing device may transmit a notification to users within the winning group indicating that the user offering (i.e., the charitable incentive) will be or has been provided to the selected charitable organization.

The methods and system described herein may be implemented using computer programming or engineering techniques including computer software, firmware, hardware, or any combination or subset. As disclosed above, at least one technical problem with current systems includes the inability to reconcile data from disparate sources, including telematics data, sensor data, and contextual data, without time-consuming and error-prone human intervention. As such, current systems may be limited in how they can use data to generate profiles of user behavior, which leads to less accurate and/or precise behavior profiles.

The technical effect of the systems and processes described herein may be achieved by performing at least one of the following steps: (a) receiving, from a vehicle computing device associated with a first vehicle, telematics data associated with a plurality of trips taken by a first driver using the first vehicle, (b) generating a driver profile of the first driver based at least in part upon the telematics data, (c) accessing, from the memory device, contextual data associated with an environment in which the first vehicle travelled during the plurality of trips, (d) synthesizing the driver profile and the contextual data to generate a contextualized driver profile, (e) based upon the contextualized driver profile, generate a user offering to influence the driver profile, and/or (f) transmit the user offering to a user computing device associated with the first driver, and/or (g) forming a first group including a first user and a second user, (h) receiving, from a first mobile device associated with the first user, first telematics data associated with movement of the first user over a period of time, (i) parsing, from the first telematics data, subsets of the first telematics data, each subset of the first telematics data associated with a respective travel mode of the first user during the period of time, (j) receiving, from a second mobile device associated with the second user, second telematics data associated with movement of the second user over the period of time, (k) parsing, from the second telematics data, subsets of the second telematics data, each subset of the second telematics data associated with a respective travel mode of the second user during the period of time, (l) retrieving at least one eligibility condition that defines eligibility for the first group to qualify for a user offering, wherein at least one of the eligibility conditions is associated with a first travel mode, (m) aggregating one subset of the first telematics data associated with the first travel mode of the first user and one subset of the second telematics data associated with the first travel mode of the second user into first group telematics data associated with the first travel mode, (n) determining whether the first group telematics data satisfies the at least one eligibility condition, and/or (o) when the first group telematics data satisfies the at least one eligibility condition, comparing the first group telematics data to a plurality of other group telematics data associated with a respective plurality of other groups to determine whether the first group has won the user offering.

The resulting technical effects may include, for example: (i) encouraging safer driver or risk averse behavior based upon recommendations and incentives; (ii) reducing the cost of providing insurance products to drivers; (iii) developing new and increasing sources of non-driving telematics data by encouraging alternative travel modes; (iv) encouraging charitable giving; and (v) enhancing driver and user profiles by incorporating contextual data therein.

Exemplary Computer System for Generating User Offerings Responsive to User Telematics Data FIG. 1 depicts a schematic diagram of an exemplary computer system 100. Computer system 100 is configured to generate dynamic and intelligent user offerings responsive to user telematics data. In one exemplary embodiment, computer system 100 may include and/or facilitate communication between one or more vehicles 102 (e.g., via an in-vehicle computing devices 104 and/or communication devices 106), one or more user computing devices 108 (which may also be referred to as "mobile devices"), and a user analytics computing device 110, and/or between user analytics computing device 110 and one or more of third party devices 112 and/or insurance servers 114.

User analytics computing device 110 may be implemented as a server computing device with artificial intelligence and deep learning functionality. Alternatively, user analytics computing device 110 may be implemented as any device capable of interconnecting to the Internet, including mobile computing device or "mobile device," such as a smartphone, a "phablet," or other web-connectable equipment or mobile devices. User analytics computing device 110 may be in communication with vehicles 102, one or more user computing devices 108, third party devices 112, and/or insurance servers 114, such as via wireless communication or data transmission over one or more radio frequency links or wireless communication channels. In the exemplary embodiment, components of computer system 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection.

Computer system 100 also includes one or more database(s) 116 containing information on a variety of matters. For example, database 116 may include such information as telematics data, sensor data, contextual data, user profiles (including driver profiles), contextualized user profiles, user offerings, user responses, group definitions, selected charitable organizations, eligibility conditions, and/or any other information used, received, and/or generated by computer system 100 and/or any component thereof, including such information as described herein. In one exemplary embodiment, database 116 may include a cloud storage device, such that information stored thereon may be securely stored but still accessed by one or more components of computer system 100, such as, for example, user analytics computing device 110, in-vehicle computing devices 104, user computing devices 108, and/or insurance servers 114. In one embodiment, database 116 may be stored on user analytics computing device 110. In any alternative embodiment, database 116 may be stored remotely from user analytics computing device 110 and may be non-centralized.

Computer system 200 includes a plurality of vehicles 102 registered therewith, where each vehicle 102 is associated with at least one respective driver user and has an insurance policy associated therewith (e.g., where insurance policies maintained by insurance server 114). In the exemplary embodiment, each vehicle 102 includes a communication device 106 such that the vehicle 102 may communicate with user analytics computing device 110, for example, via the Internet, to receive instructions and/or transmit telematics data, sensor data, and/or other information. Vehicle 102 may additionally communicate with other components of computer system 100, such as database 116, user computing device(s) 108, insurance server 114, etc. Vehicles 102 may be configured to capture and/or generate telematics and/or sensor data during operation thereof (whether the vehicles are autonomous, semi-autonomous, and/or manually driven). Specifically, vehicles 102 have one or more sensors disposed thereon, such as location sensors, audio sensors, video sensors, cameras, LIDAR, RADAR, GPS/navigation systems, acceleration/deceleration sensors, braking sensors, turning sensors, scanners, and/or any other sensor, including those described elsewhere herein.

The sensors operate and collect and/or generate telematics and/or sensor data passively and/or actively as the vehicle 102 operates. The sensors may detect, for example, conditions of vehicle 102, such as speed, acceleration, gear, braking, and other conditions related to the operation of vehicle 102, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. In some embodiments, the sensor data includes information captured about the environment and/or other objects around the vehicle (e.g., infrastructure, weather, other vehicles, people, etc.). User analytics computing device 110 may receive any such data from vehicles 102 (e.g., via in-vehicle computing device 104 and communication device 106).

In the exemplary embodiment, user computing devices 108 may be computers that include a web browser or a software application to enable user computing devices 108 to access the functionality of user analytics computing device 110 using the Internet or a direct connection, such as a cellular network connection. User computing devices 108 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Each user computing device 108 may be associated with a particular user, which may include an insured associated with an insurance policy offered by insurance server 114. User computing devices 108 may be used to access a data management app (e.g., a telematics collection app, insurance app, and/or game app) 120 maintained by user analytics computing device 110, for example, via a user interface 122 when data management app 120 is executed on user computing device 108. A user may use data management app 120 to provide inputs to user analytics computing device 110, change preferences (e.g., provide permission for user analytics computing device 110 to receive telematics data), receive user offerings, view personal and/or group telematics data, view insurance policy information, and perform other actions, including those described elsewhere herein.

User computing devices 108 may be configured to capture and/or generate telematics and/or sensor data during operation thereof (e.g., while the user computing device 108 is on or active and/or in motion). Specifically, user computing devices 108 have one or more sensors disposed thereon, such as location sensors, audio sensors, video sensors, cameras, GPS/navigation systems, accelerometers, gyroscopes, scanners, and/or any other sensor, including those described elsewhere herein. The sensors operate and collect and/or generate telematics and/or sensor data passively and/or actively as user computing device 108 is operating. In some embodiments, the sensor data includes information captured about the respective device's motion, the environment around the device (e.g., temperature, sounds, etc.), and objects around the device. User analytics computing device 110 may receive any such data from user computing devices 108.

User analytics computing device 110 may be configured to process telematics data and/or sensor data received from vehicles 102 and/or user computing devices 108, and/or data received from third-party devices 112, to generate user profiles indicative of user behavior, such as driving profiles. User analytics computing device 110 may be further configured to leverage contextual data (which may be received from any of the above-described devices and/or accessed from database 116) to enrich the generated user profiles. User analytics computing device 110 may then generate user-specific and context-specific user offerings, such as recommendations, incentives, and the like, to affect or influence user behavior (e.g., to reduce risk, reduce user costs, generate additional or alternative telematics data, incorporate different travel modes, etc.).

Third party devices 112 may be computing devices associated with external sources of data, such as sources of contextual data. User analytics computing device 110 may request, receive, and/or otherwise access data from third party devices 112. Third party devices 112 may be any devices capable of interconnecting to the Internet, including a server computing device, a mobile computing device or "mobile device," such as a smartphone, or other webconnectable equipment or mobile devices.

Insurance server 114 may be associated with and/or maintained by an insurance provider, which provides insurance policies associated with vehicles 102, vehicle users, and the like. Insurance server 114 may communicate with user analytics computing device 110, vehicles 102, user computing device(s) 108, and/or database 116 in order to transmit and/or receive information associated with the insurance policies. For example, insurance server 114 may transmit insurance policies to user analytics computing device 110, and/or may receive or access user profiles, user offerings, responses to user offerings, and the like.

In the exemplary embodiment, third party devices 112 and/or insurance server 114 may be a source of eligibility conditions for one or more incentives, as described herein, such as those associated with group telematics data competitions. Third party devices 112 and/or insurance server 114 may, in some cases, desire additional telematics data associated with a particular travel mode, and may therefore initiate a competition for a charitable incentive based upon an eligibility condition requiring groups (and member users thereof) participate in that travel mode. Eligibility conditions may be selected and/or defined for any purpose and with any characteristics. User analytics computing device 110 may receive eligibility conditions form third party devices 112 and/or insurance server 114 and may compare group telematics data to those eligibility conditions to determine which groups quality to compete for a particular charitable incentive and, thereafter, which group won the charitable incentive.

Exemplary User Analytics Computing Device

Figure 2:
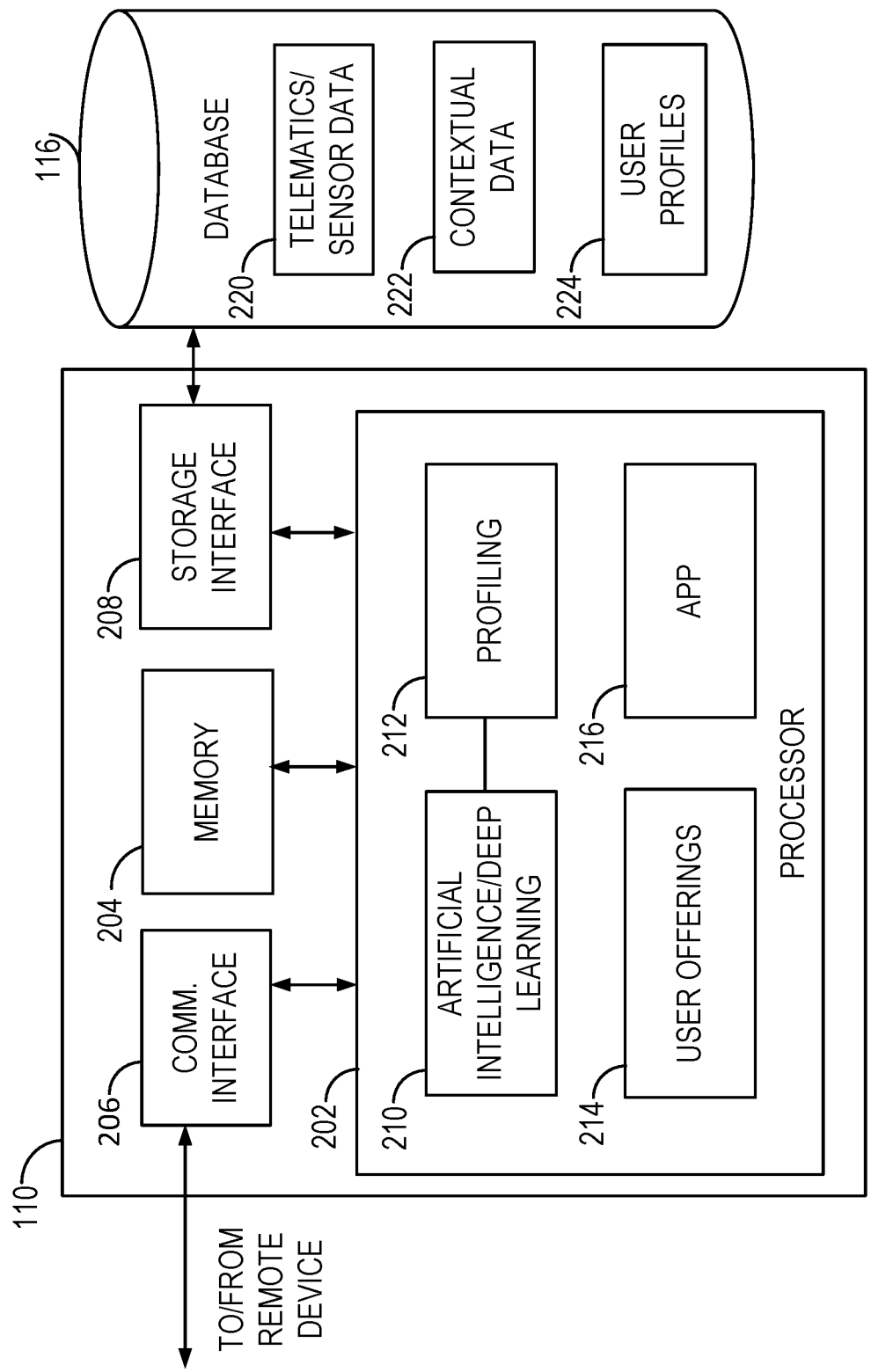
FIG. 2 illustrates a schematic diagram of an exemplary user analytics computing device that may be used in the computer system shown in FIG. 1.

FIG. 2 depicts an exemplary user analytics computing device 110 (as shown in FIG. 1). In one exemplary embodiment, user analytics computing device 110 may include a processor 202, a memory 204 (which may be similar to database 116, also shown in FIG. 1), a communication interface 206, and a storage interface 208. Processor 202 is configured to execute instructions, which may be stored in memory 204. Processor 202 includes one or more processing units (e.g., in a multi-core configuration) and may be configured to execute a plurality of modules.

In the exemplary embodiment, processor 202 is operable to execute an artificial intelligence/deep learning (AI/DL) module 210, a profiling module 212, a user offerings module 214, and a module 216 that maintains functionality for data management app 120 (shown in FIG. 1). Modules 210, 212, 214, and 216 may include specialized instruction sets, and/or coprocessors. Database 116 and/or memory 204 may store any data and/or instructions necessary for modules 210, 212, 214, and 216 to function as described herein. In the exemplary embodiment, database 116 may store telematics and/or sensor data 220, contextual data 222, and/or user profiles 224 (which may include driver profiles, non-contextualized profiles, and/or contextualized profiles, as described herein).

AI/DL module 210 may execute artificial intelligence and/or deep learning functionality on behalf of profiling module 212. Specifically, AI/DL module 210 may include any rules, algorithms, training data sets/programs, and/or any other suitable data and/or executable instructions that enable user analytics computing device 110 employ artificial intelligence and/or deep learning to generate non-contextualized and contextualized profiles 224, user offerings, and the like.

Profiling module 212 may create user profiles 224 that represent user behavior, which may be leveraged (e.g., by user offerings module 214) to generate user offerings for one or more user responsive to those users' telematics data. For example, profiling module 212 may access and process telematics data and/or sensor data 220 received from a user computing device 108 and/or a vehicle 102 to generate a user profile 224 indicative of a user's behavior, as described here. Profiling module 212 may access and process contextual data 222, and synthesize the contextual data 222 and the user profile 224 to generate a contextualized user profile 224, which incorporates information not specific to the user's behavior to enrich, explain, and/or otherwise add context thereto.

For example, a driving profile 224 may include is a summary, aggregation, and/or general description of a user's driving behavior. Profiling module 212 may develop or generate driving profile 224 over time, based upon telematics data and/or sensor data 220 associated with one or more trips the user has taken in which the user was the driver. Driving profile 224 may therefore include data associated with how the user drives (e.g., speed, acceleration, braking, cornering, following distance), where the user drives (e.g., "common" routes), when the user drives (e.g., "common" commute times), and the like. Driving profile 224 may include average values, maximum values, minimum values, weight averages, median values, ranges, and other quantitative measures of the user's driving behavior. Driving profile 224 may also include non-quantitative elements, such as locations, routes, and the like.

Profiling module 212 may be configured to employ AI/DL module 210 to identify patterns and/or trends, for example, in telematics/sensor data 220 and/or contextual data 222 to generate a contextualized user profile. In the exemplary embodiment, AI/DL module 210 may identify timing, traffic, speed, location, and/or travel mode trends and/or patterns that profiling module 212 incorporates into the contextualized user profile 224.

Specifically, profiling module 212 may access, receive, and/or retrieve contextual data 222 that profiling module 212 can leverage to contextualize the generated driver profile, or generate a "contextualized driving profile" 224 In particular, contextualized driving profile 224 incorporates data external to the user's behavior that may influence or affect the user's behavior into the driving profile. For example, contextual data 222 may include posted speed limit data at locations or along routes the user where the user travels. Profiling module 212 may synthesize this contextual data 222 with an initial driving profile (e.g., objective data about the user's driving speed) to generate the contextualized driving profile that includes indicators of whether the user follows or occasionally exceeds posted speed limits. For instance, the contextualized driving profile may include a numeric value or score that indicates how often the user exceeds the speed limit (e.g., 30% of the time) or to what extent the user exceeds the speed limit (e.g., an average of 5 MPH over the posted speed limit, or an average of 10% over the posted speed limit). Additionally or alternatively, the contextualized driving profile may include a qualitative indicator, such as "occasionally exceeds the speed limit."

Continuing with the above example, profiling module 212 may incorporate additional contextual data 222, such as sensor data associated with the behavior of other vehicles 102, into the contextualized driving profile. For instance, the contextualized driving profile may indicate the user frequently exceeds the speed limit by 10 MPH during a particular portion of their morning commute (e.g., a route frequently travelled at the same time every weekday). However, upon incorporating data associated with other vehicles 102 travelling at the same location at the same time, profiling module 212 determines that the user travels at an average or comparatively low speed, relative to other drivers on the road. Accordingly, profiling module 212 may update the contextualized driving profile to reflect that the driver travels at an "acceptable," "normal," or "standard" speed, or some other designation.

As another example, contextual data 222 may include information associated with a common or frequently travelled route. As used herein, a "common" route may include a route the user travels more than a threshold number of times within a certain duration (e.g., within a week, month, or year) and/or a route the user travels with a defined periodicity (e.g., every weekday morning, every Tuesday evening, etc.). Profiling module 222 may identify common routes using telematics data 220 from the user's computing device 108 and/or connected vehicle 102. In some instances, contextual data 222 associated with a common route may include, for example, traffic data, traffic light timing data, weather data, and the like. Traffic data may be provided by a third party device 112 (e.g., WAZE or GOOGLE) and/or may be determined based upon sensor and/or telematics data 220 from a plurality of connected vehicles 102. Traffic light timing data may be provided by a third party device 112 (e.g., by a representative of a city or metro area) and/or may be determined based upon sensor and/or telematics data 220 from one or more connected vehicles 102 (e.g., using image/video data captured by on-board cameras while the vehicle(s) 102 travel along the common route).

Profiling module 212 may synthesize contextual data 222 with the driving profile (e.g., the user's common routes, the time(s) the common routes are travelled, the user's speed along the common route, etc.) to generate a contextualized driving profile that includes a model of the user's travel along the common route. In particular, profiling module 212 may employ AI/DL module 210 to train a machine learning model using the user's driving behavior over a period of time (e.g., one week, two weeks, one month, etc.) such that the model learns the user's common routes, when the user travels along the common routes, how the user travels along the common route (e.g., average speed overall, average speed along certain portions of the route, number of stops, etc.) and how contextual data 222 (e.g., traffic, traffic lights, weather) affects the user's travel or driving behaviors.

Profiling module 212 may employ AI/DL module 210 to use the trained model to predict potential (future) travel for the user. For instance, the user analytics computing device may use the trained model to predict the user will travel along Route A (e.g., a commute route) on Monday morning. Profiling module 212 may employ AI/DL module 210 to use the trained model and contextual data 222, including historical and current contextual data, to model various iterations of the user's potential travel, based upon when the user initiates travel along Route A. For example, profiling module 212 may employ AI/DL module 210 to use the trained model to predict the user's travel along Route A if the user leaves at 6:50, 6:57, 7:01, 7:05, 7:13, 7:15, etc. Additionally or alternatively, profiling module 212 may employ AI/DL module 210 to use the trained model and contextual data 222 to model various iterations of the user's potential travel along variations of Route A, such as using alternative streets during portions of Route A.

Profiling module 212 may use the output from the trained model to identify a most efficient route. The most efficient route may include the route in which the user encounters the fewer number of red lights, the route in which the user is stopped or slowed by traffic the least, and/or the fastest route. The trained model may generate routes, including the most efficient routes, based at least in part upon the user's typical speed along the common route and/or the posted speed limit along the common route. In some instances, the most efficient route includes travel at the posted speed limit.

User offerings module 214 may generate user offerings, such as recommendations and/or incentives, based upon the contextualized user profiles 224. Specifically, the user offerings may influence or affect a user's behavior, which may, in turn, affect the user's profile. For example, user offerings module 214 may generate a recommendation that the user change their driving behavior (such as lowering their average speed overall or their average speed along a portion of a commonly travelled route) to lower their risk and, in some cases, an incentive to follow the recommendation (such as a decreased insurance premium or a discount).

As another example, user offerings module 214 may generate a recommendation that a user alter a typical route to avoid a location that AI/DL module 210 identified as a high-risk location. As yet another example, user offerings module 214 may generate a recommendation that the user employ a different travel mode (e.g., using the bus rather than driving) and, in some cases, an incentive to follow the recommendation (e.g., a decreased insurance premium, a reduction in gas or vehicle maintenance costs, etc.).

In the exemplary embodiment, user offerings module 214 may generate user offerings based upon trends and/or patterns identified within the contextualized user profiles 224, based upon user preferences or settings, and/or based upon contextual data 222. For example, user offerings module 214 may leverage contextual data 222 to identify upcoming events likely to disrupt a user's commute or other behavior, and may therefore generate a user offering including a recommendation that the user take public transportation to avoid excessive traffic associated with the event.

In one particular embodiment, user offerings module 214 may generate a user offering including a notification of the costs associated with the user's driving behavior and a recommendation for reducing those costs based upon a proposed change to the user's driving behavior. User offerings module 214 may access contextual data 222 including cost data. The cost data may be associated with a particular vehicle 102, such as the driver's vehicle 102. For example, the cost data may be associated with gas mileage data for the make, model, and/or year of the driver's vehicle 102. The cost data may also include geography-dependent costs, such as the cost of gas, vehicle maintenance, and/or vehicle repair in the user's geographic area. The cost data may also include costs specific to the user, such as an insurance premium for an insurance policy associated with the user's vehicle 102. In some cases, contextual data 222 may include additional geography-dependent data, such as available public transportation (e.g., buses, trains, streetcars, etc.) and/or other alternative forms of transportation (e.g., taxis, ride-sharing, bike rentals or bike-sharing, scooters, etc.).

User offerings module 214 may be configured to synthesize this contextual data with the user's driving profile and/or existing contextualized driving profile to calculate costs associated with the user's driving behavior (in some cases, user offerings module 214 may employ profiling module 212 to perform this synthesis). For instance, user offerings module 214 (and/or profiling module 212) may calculate the gas costs associated with the user's average driving behavior, which is 3-5 MPH over a posted speed limit. User offerings module 214 (and/or profiling module 212) may additionally or alternatively calculate estimated maintenance costs associated with this driving behavior. User offerings module 214 may therefore generate a user offering including a recommendation that the user decrease their average speed by 3-5 MPH and a notification that such a behavior change could result in a savings of the above-described costs. The user offering may further include an incentive for following the recommendation, such as a reduction in the user's insurance premium. Accordingly, the user may both reduce their overall risk (e.g., by reducing their driving speed) and save money (e.g., by reducing their gas costs and/or receiving the incentive).

In another embodiment, user offerings module 214 may generate a user offering including a notification of the identified most efficient route, as described above, and a recommendation of the optimal travel initiation time (i.e., the time at which to initiate travel along the most efficient route). The travel initiation time may be a specific minute or may be a window of time (e.g., up to five minutes). In some embodiments, there may be a plurality of travel initiation times that enable the user to access the most efficient route, such as a plurality of windows of time throughout an hour. User offerings module 214 may transmit the user offering to the user for display within data management app 120 and/or using any other notification format (e.g., text message, email, push notification) at a time preceding the travel initiation time, such as a day or an hour preceding the travel initiation time. In some instances, the user offering may further include a recommendation that the user maintain speed at a particular speed along one or more portions of the most efficient route (e.g., no more than a posted speed limit) to take advantage of the most efficient route. That is, travelling too fast (e.g., above the posted speed limit) may cause the user to "catch up" to red lights or other traffic, which reduces the efficiency of the most efficient route.

In some instances, the user offering may also include an incentive for following the recommendation, such as a reduction in the user's insurance premium. Specifically, initiating travel along the most efficient route at the optimal travel initiation time may reduce a user's overall driving risk, as less "stop and go" traffic reduces the risk of collisions and/or the user may reduce their travelling speed. Accordingly, the user may both reduce their overall risk and save money (e.g., by receiving the incentive).

In some embodiments, user offerings module 214 generates the user offering based upon historical data, that is, based upon the user's past driving behavior. In some such embodiments, user offerings module 214 may transmit the user offering to the user once, for example, in response to a request from the user or in response to determining that the user is eligible for the user offering (e.g., based upon the user's driving profile and/or contextualized driving profile). User offerings module 214 may transmit the user offering to the user within data management app 120. Data management app 120 may display the user offering to the user as a report or document that includes the recommendation and/or the notification. In some embodiment, the report includes additional information, such as a total savings amount over a period of time (e.g., if the recommendation is followed).

In other embodiments, user offerings module 214 may generate and/or transmit user offerings in real-time, that is, based upon the user's current driving behavior (which may be compared to past behavior based upon a previously generated driving profile and/or which may be based upon telematics data, sensor data, and/or contextual data received and/or otherwise accessed in real-time). In some such embodiments, user offerings module 214 may transmit the user offering to the user in the form of alerts (e.g., within the app, as a text message or push notification, etc.). The alerts may identify the user's current behavior (e.g., following or occasionally exceeding a posted speed limit) and may include the recommendation to modify the user's driving behavior (e.g., "reduce your speed to the posted speed limit"). In some embodiments, the alert may also include an incentive, as described above, which may be a monetary incentive (e.g., "maintain your speed to the posted limit to receive a discount on your insurance premium" or "reduce your speed to the posted limit to avoiding hitting additional red lights"). Additionally or alternatively, the alerts may include contextual data 222 (e.g., "There is traffic ahead. Adjust your route by [taking a particular action, such as slowing down or taking an alternative route] to maintain efficiency.").

Additionally or alternatively, user offerings module 214 may identify, based upon contextual data 222, one or more alternative forms of transportation available to the user. User offering module 214 may employ AI/DL module 210 to model, using artificial intelligence, potential transportation options for the user that incorporate at least one of these alternative forms of transportation, and may calculate the cost(s) associated therewith. If such costs are lower than costs calculated by user offerings module 214 (and/or profiling module 212) for the user's typical behavior (e.g., commuting to and from work in their personal vehicle), user offerings module 214 may generate a user offering include a recommendation that the user incorporate the alternative form(s) of transportation and a notification that such a behavior change could results in a savings. The user offering may further include an incentive for following the recommendation, such as a reduction in the user's insurance premium or an increased discount (e.g., because the user will be driving less and therefore has a reduced driving risk) and/or an alternative premium associated with an alternative policy (e.g., an on-demand personal mobility policy associated with alternative forms of transportation). Accordingly, the user may both reduce their overall risk (e.g., by driving less) and save money (e.g., by reducing their transportation costs and/or receiving the incentive).

In another exemplary embodiment of the present disclosure, the user offering may be a charitable incentive responsive to the user's telematics data 220 satisfying one or more eligibility conditions. Telematics data 220 may be received from the user's computing device 108 and may be indicative of a mode of travel of the user, including driving (e.g., driving their own personal vehicle 102), riding one or more forms of mobile transportation (e.g., buses, trains, planes, streetcars, bikes, scooters, etc.), and/or unassisted movement of the user (e.g., walking, jogging, running—movement not assisted by a transportation apparatus). The charitable incentive is an amount of money to be gifted to a charitable organization on behalf of one or more users that "earn" the charitable incentive based upon their behavior, as represented by their telematics data 220.

Moreover, the user may be aggregated with other users into a group, and the "group telematics data" (i.e., the aggregated telematics data of all users in the group) may be considered against the eligibility conditions. A plurality of groups may compete against each other to earn the charitable incentive for a specific charitable organization selected by the winning group.

The charitable incentive may be associated with one or more eligibility conditions, which may be input to user analytics computing device 110 by an administrator and/or transmitted to user analytics computing device 110 by a third party device 112 and/or insurance server 114. Some eligibility conditions may include instructions or requests associated with particular modes of transportation. For instance, one eligibility condition may include "take a public bus at least twice over the next week," while another may include "ride a bike to work tomorrow." The eligibility conditions may be associated with a particular mode (or modes) of transportation, a number of minutes or distance over which the mode of transportation is to be used, a period of time over which the eligibility condition is active or available, and/or other factors.

Additionally or alternatively, the eligibility conditions may be associated with a user's behavior using a particular mode of transportation. For example, one eligibility condition may be a "safe driving" condition, in which users' telematics data 220 is analyzed for safe driving characteristics (e.g., slower acceleration, softer braking, safer cornering) and assigned an objective score. The group with the best average (or weighted average) "safe driving" score may earn the charitable incentive. As another example, one eligibility condition may be associated with a number of "active" miles, including miles biked, walked, run, or jogged. The group with the highest number of "active" miles (or highest average "per capita" mileage) may earn the charitable incentive. In some cases, group telematics data (e.g., the aggregated telematics data 220 for all member users within a group) may not compared directly with other group telematics data to determine a winner of a charitable incentive. For example, meeting certain criteria or milestones (e.g., a number of total miles walked or a number of bicycle rides) may count towards "entries" into a lottery-style competition. In such an example, a winning group is chosen at random, but groups with high participation rates may increase their chances of winning.

User offerings module 214 may notify the user of the eligibility condition(s) via data management app 120. Some eligibility conditions may further require the user to activate their data management app 120 during the requested activity and/or to "log" their activities in order to transmit their telematics data 220 to user analytics computing device 110 for consideration.

Profiling module 212 and/or user offerings module 214 may be configured to parse telematics data 220 associated with each different travel mode based upon received telematics data 220 from a user computing device 108. In some embodiments, profiling module 212 and/or user offerings module 214 may employ AI/DL module 210 to leverage artificial intelligence and/or machine learning capabilities to determine which travel mode a user was using at any time. For example, certain models may be trained to recognize different travel modes based upon a speed or pace of the user, a location of the user during travel (e.g., within a park that does not allow vehicles), a distance travelled by the user, and/or a time of travel. Additionally or alternatively, profiling module 212 and/or user offerings module 214 may receive, retrieve, request, and/or access other data to determine and/or confirm a particular mode of travel. For example, profiling module 212 and/or user offerings module 214 may be configured to leverage data from rental applications executed on the user's computing device 108 (e.g., bike rental apps, scooter rental apps, ride-sharing apps, etc.) to determine and/or confirm a user's travel mode.

Groups may be formed in a variety of different ways. Groups may be location-based, such as a group including members from a same city or same neighborhood. Groups may be formed based upon a shared charitable organization. For instance, a user may register with user analytics computing device 110 to participate, and may select a particular charitable organization they wish to compete for. That user may be designated as part of a group of users competing for the same charitable organization, regardless of physical location. Groups may be self-designated, such as a group of people that choose to form a group together, or may be designated by user analytics computing device, for users that do not specify a group they wish to join. Groups may include a specific number of users to compete for certain charitable incentives (e.g., a 50-100 person group) or may have any number of users.

In these embodiments, user offerings module 214 generates the user offering based upon which group has earned the charitable incentive (e.g., by meeting the eligibility condition and exceeding all other competing groups). User offerings module 214 device transmits a notification to users within the winning group indicating that the user offering (i.e., the charitable incentive) will be or has been provided to the selected charitable organization.

User offerings module 214 may be configured to generate and transmit user offerings to user computing devices 108 for display to users. In the exemplary embodiment, user offerings module 214 may provide generated user offerings (e.g., recommendations, notifications, incentives, etc.) through data management app 120. Accordingly, user offerings module 214 may employ module 216 to provide the user offerings to user computing devices 108 through data management app 120.

Module 216 is configured to facilitate maintaining data management app 120 and providing the functionality thereof to users. Module 216 may store instructions that enable the download and/or execution of data management app 120 at user computing devices 108. Module 216 may store instructions regarding user interfaces, controls, commands, settings, and the like, and may format data, such as telematics data, sensor data, contextual data, user profiles, user offerings, eligibility conditions, and the like, into a format suitable for transmitting to user computing devices 108 for display thereat.

In the exemplary embodiment, processor 202 is operatively coupled to communication interface 206 such that user analytics computing device 110 is capable of communicating with remote device(s) such as vehicles 102, user computing devices 108, third party devices 112, and/or insurance servers 114 (all shown in FIG. 1) over a wired or wireless connection. For example, communication interface 206 may receive telematics, sensor, and/or contextual data from user computing devices 108, vehicles 102, and/or third-party devices 112. Communication interface 206 may include, for example, a wired or wireless network adapter and/or a wireless data transceiver for use with a mobile telecommunications network.

Processor 206 may also be operatively coupled to database 116 (and/or any other storage device) via storage interface 208. Database 116 may be any computer-operated hardware suitable for storing and/or retrieving data. In some embodiments, database 116 may be integrated in user analytics computing device 110. For example user analytics computing device 110 may include one or more hard disk drives as database 116. In other embodiments, database 116 is external to user analytics computing device 110 and is accessed by a plurality of computer devices. For example, database 116 may include a storage area network (SAN), a network attached storage (NAS) system, multiple storage units such as hard disks and/or solid state disks in a redundant array of inexpensive disks (RAID) configuration, cloud storage devices, and/or any other suitable storage device.

Storage interface 208 may be any component capable of providing processor 202 with access to database 116. Storage interface 208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 202 with access to database 116.

Processor 202 may execute computer-executable instructions for implementing aspects of the disclosure. In some embodiments, processor 202 may be transformed into a special purpose microprocessor by executing computer-executable instructions or by otherwise being programmed. For example, processor 202 may be programmed with the instructions such as those illustrated in FIGS. 6 and 7.

Memory 204 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Data Management App

In the exemplary embodiment, user analytics computing device 110 may also maintain data management software application or "app" 120 that enables users to track various metrics associated with their behavior (e.g., driving profiles, travel modes used, etc.), adjust user settings, and access a plurality of services associated with computer system 100, including receiving and responding to user offerings and competing to earn charitable incentives. Data management app 120 may be executed on user computing devices 108 and/or in-vehicle computing devices 104, as described elsewhere herein.

In one embodiment, data management app 120 enables a user to view telematics data, sensor data, and/or contextual data collected by their vehicle 102 and/or user computing device 108 that is transmitted to user analytics computing device 110. Data management app 120 may further enable the vehicle user to adjust one or more settings, such as user preferences associated with what data is transmitted and/or how often data is transmitted. Data management app 120 may also enable a user to sync profiles or data transmission with other services or apps on their device(s), such as ride-sharing apps, vehicle-rental apps, and the like.

Data management app 120 may provide a user with eligibility conditions and metrics associated with earning charitable incentives for selected charitable organizations. A user may view the eligibility conditions, may view their group's rank among other groups, may view how their personal telematics data are contributed to their group, and the like. The user may also use data management app 120 to form a group, join a group, or leave a group, and/or to select a charitable organization to compete for.

Figure 3:
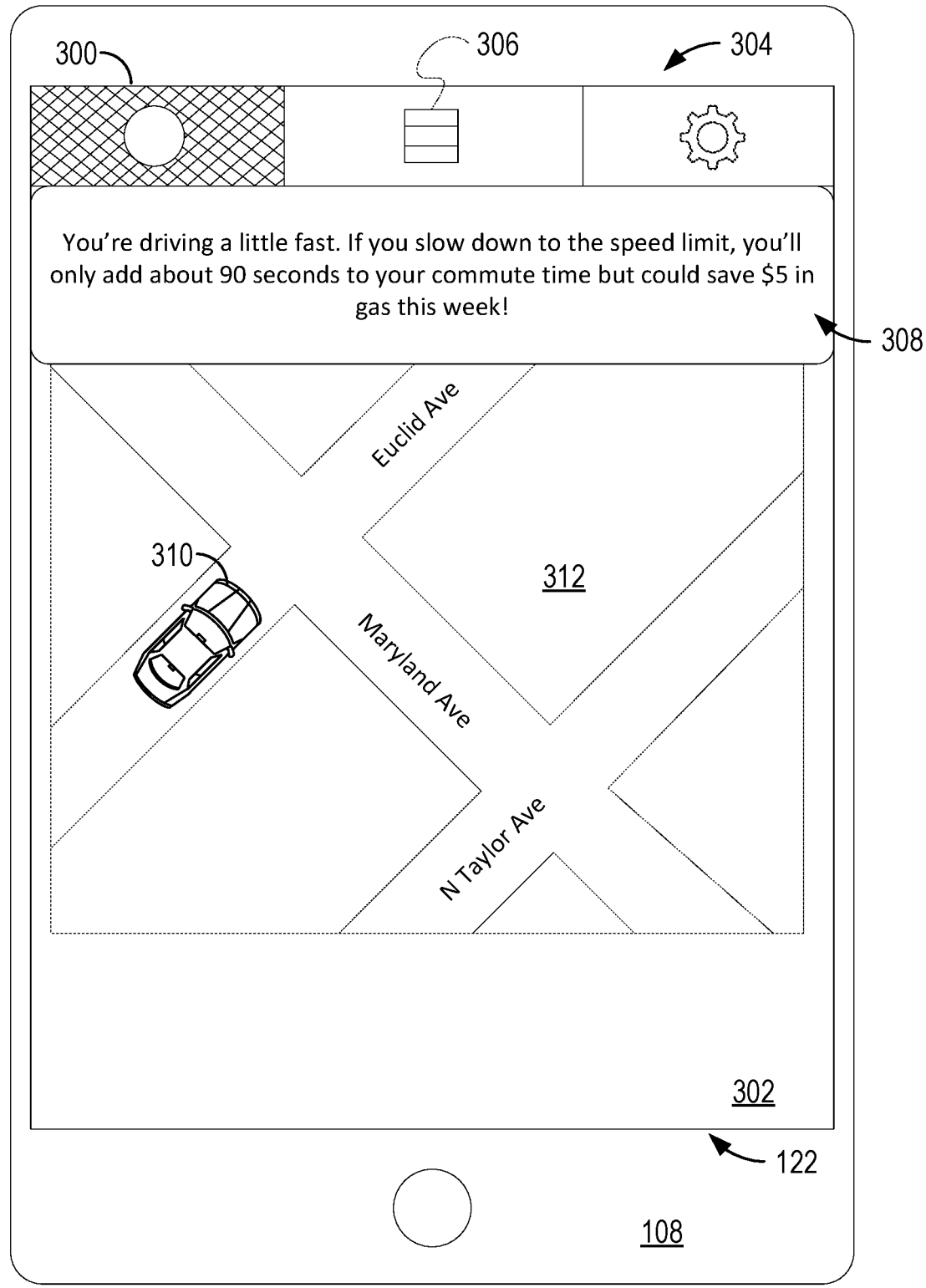
FIGS. 3 and 4 depict exemplary screen captures of a data management software application ("app") maintained using the computer system shown in FIG. 1.
Figure 4:
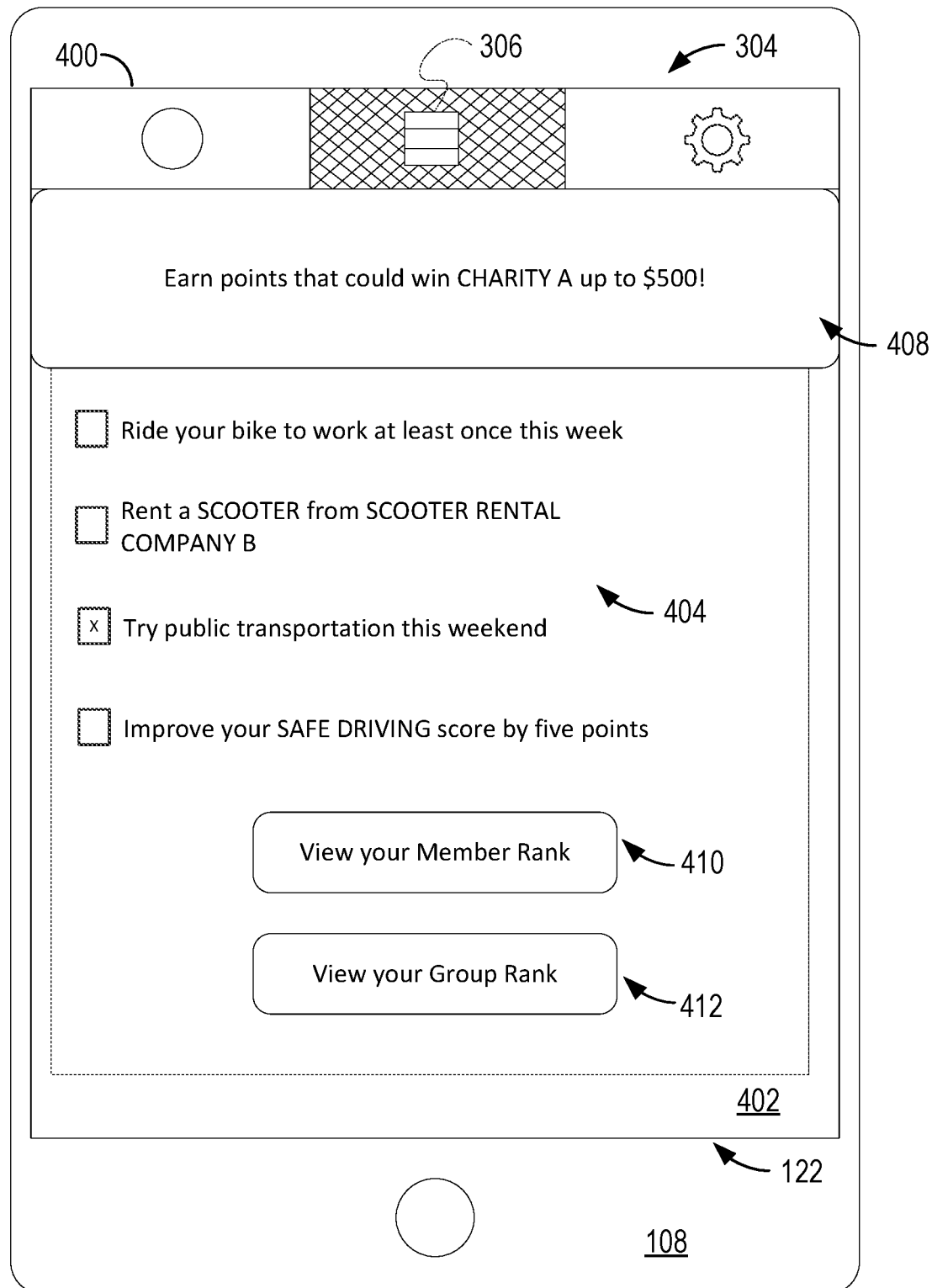

FIGS. 3 and 4 depict exemplary screen captures or "screenshots" of user interface 122 of data management app 120 as executed on a user computing device 108 (all shown in FIG. 1). The example screenshots include various features and functionalities of data management app 120. In particular, user analytics computing device 110 causes to be displayed at least user offerings at user computing device 108, specifically via data management app 120.

More specifically, FIG. 3 depicts a screenshot 300 of a first page 302 accessed by a user within user interface 122 of data management app 120. First page 302 may display a menu 304 of icons 306 that may be selected by the user to access different sections, pages, and/or functionality of data management app 120. In the illustrated embodiment, menu 304 includes icons 306 associated with Motion (represented as a circle), Charity (represented as a lined box), and Settings (represented as a gear). It should be readily understood that menu 304 may include additional, fewer, and/or alternative icons 306 that may represent additional, fewer, and/or alternative sections, pages, and/or functionality within data management app 120.

In the illustrated embodiment, the user has selected the icon 306 associated with the Motion section to display first page 302. First page 302 displays a current location of user computing device 108 and a travel mode a user of user computing device 108 is travelling under (e.g., using a vehicle, in the case of FIG. 3). The current location is displayed as an icon 310 of the vehicle on a map 312. Also shown is a user offering 308, embodied as a pop-up or push notification overlaid on map 312. In this example, user offering 308 includes a recommendation that the user reduce their speed, and an indication that the user will save money by doing so.

FIG. 4 depicts a screenshot 400 of a second page 402 accessed by a user within user interface 122 of data management app 120. In the illustrated embodiment, the user has selected the icon 406 associated with the Charity section to display second page 402. User interface 122 displays a list of eligibility conditions 404 associated with a user offering 408, embodied as a charitable incentive to a selected charity (e.g., Charity A). Second page 402 also includes a "View your Member Rank" control 410 and a "View your Group Rank" control 412. Selection of control 410 may cause user interface 122 to display metrics associated with the user's personal telematics data, such as a graph or "smart chart", a list of travel modes, a number of points earned, and the like, relative to other members of a same group. Selection of control 412 may cause user interface to display metrics associated with the group's total telematics data relative to other groups competing for the same charitable incentive.

Exemplary User Computer Device

Figure 5:
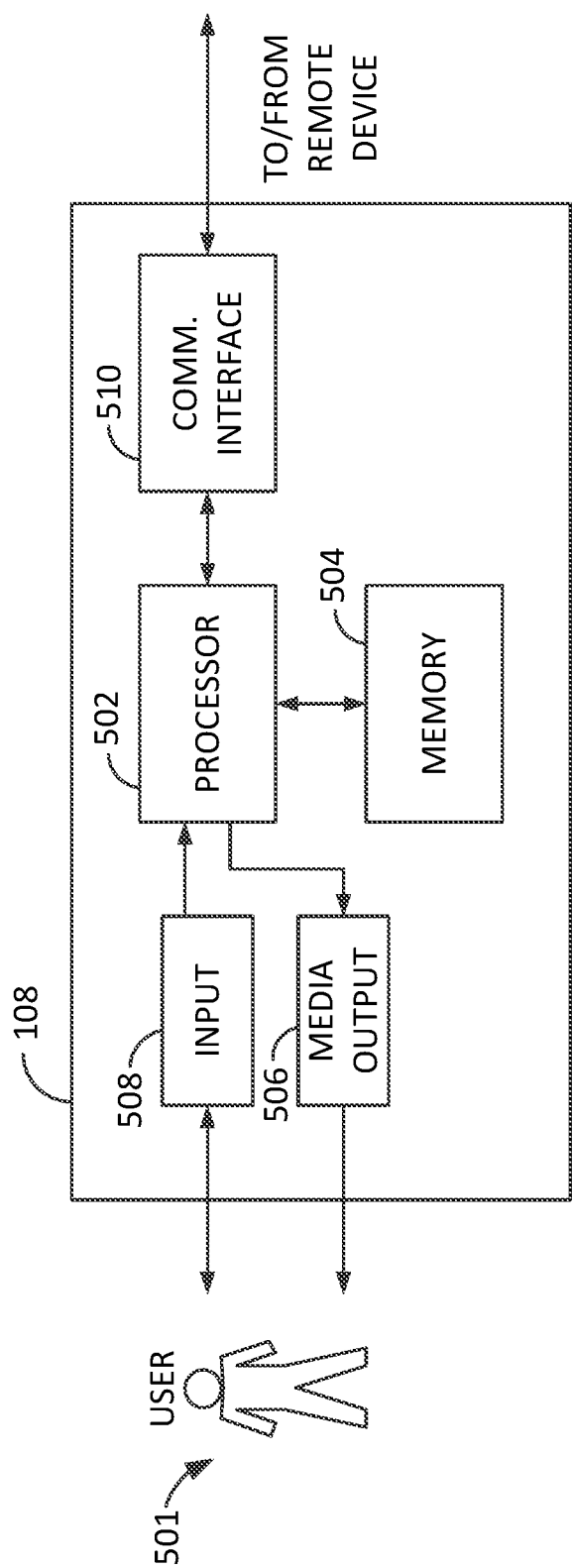
FIG. 5 illustrates a schematic diagram of an exemplary user computing device that may be used in the computer system shown in FIG. 1.

FIG. 5 depicts an exemplary configuration of an exemplary user computer device 108 that may be used with computer system 100 (shown in FIG. 1), in accordance with one embodiment of the present disclosure. User computer device 108 may be operated by a user 501.

User computer device 108 may include a processor 502 for executing instructions. In some embodiments, executable instructions may be stored in a memory area 504. Processor 502 may include one or more processing units (e.g., in a multi-core configuration). Memory area 504 may be any device allowing information such as executable instructions and/or transaction data to be stored and retrieved. Memory area 504 may include one or more computer-readable media. Memory area 804 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

User computer device 108 also may include at least one media output component 506 for presenting information to user 501, such as user interface 122 of data management app 120 (both shown in FIG. 1) when data management app 120 is executed on user computing device 108. Media output component 506 may be any component capable of conveying information to user 801. In some embodiments, media output component 506 may include an output adapter (not shown), such as a video adapter and/or an audio adapter. An output adapter may be operatively coupled to processor 502 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

In some embodiments, user computer device 108 may include an input device 508 for receiving input from user

501. User 501 may use input device 508 to, without limitation, interact with user analytics computing device 110 (both in FIG. 1), receive user offerings, and the like. Input device 508 may include, for example, a keyboard, a pointing device, a mouse, a stylus, and/or a touch sensitive panel (e.g., a touch pad or a touch screen). A single component such as a touch screen may function as both an output device of media output component 506 and input device 508.

User computer device 108 may also include a communication interface 510, communicatively coupled to a remote device such as user analytics computing device 110. Communication interface 510 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 504 may be, for example, computer-readable instructions for providing a user interface to user 501 via media output component 506 and, optionally, receiving and processing input from input device 508. The user interface may include, among other possibilities, a web browser and/or a client application. Web browsers enable users, such as user 501, to display and interact with media and other information typically embedded on a web page or a website from user analytics computing device 110. A client application (e.g., data management app 120) may allow user 501 to interact with, for example, user analytics computing device 110. For example, instructions may be stored by a cloud service and the output of the execution of the instructions sent to the media output component 506.

Figure 6:
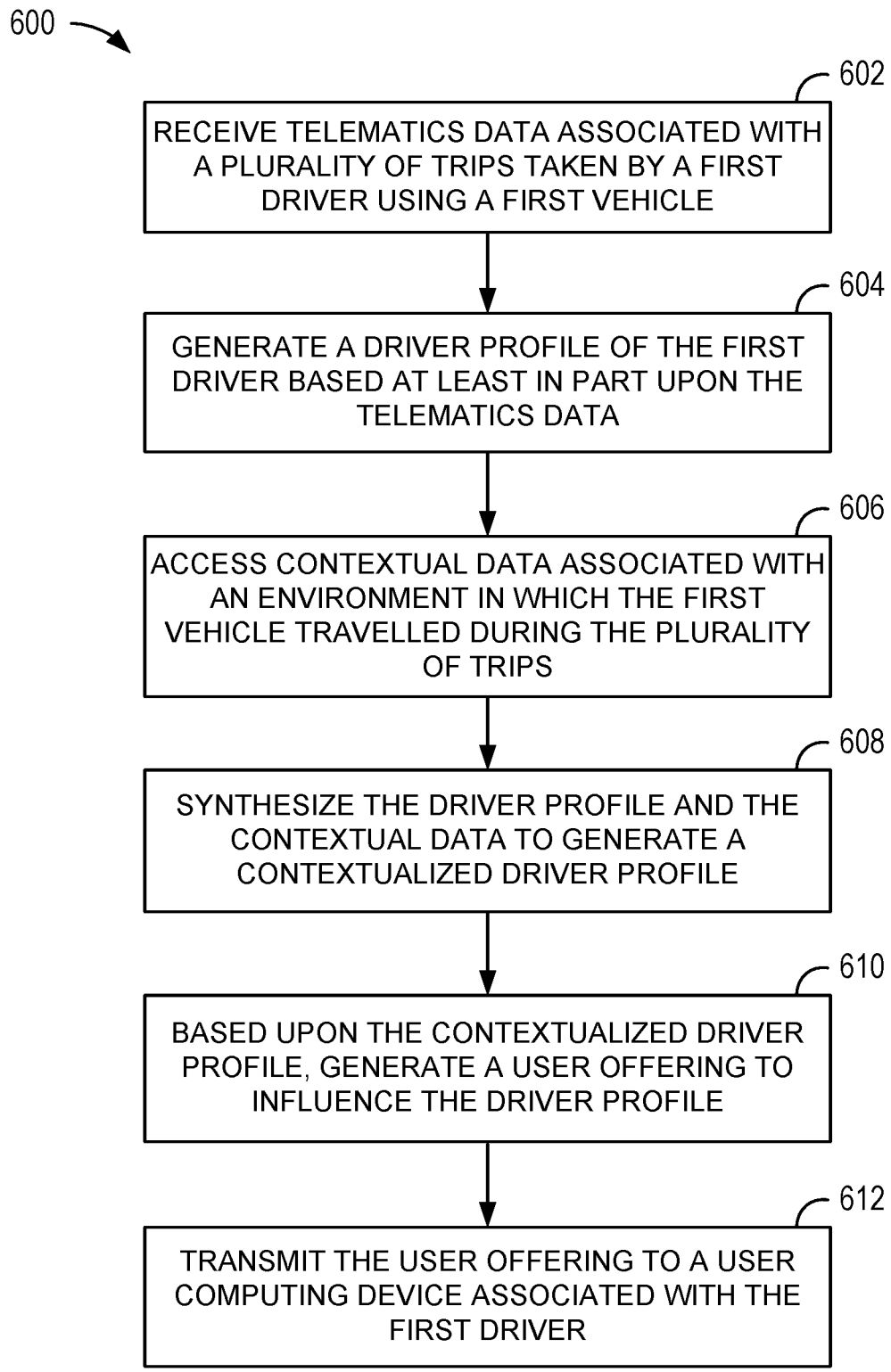
FIG. 6 illustrates a flow chart of an exemplary computer-implemented method for processing vehicle-based telematics data and generating user offerings responsive to the vehicle-based telematics data, using the computer system shown in FIG. 1.

Exemplary Computer-Implemented Method for Processing Vehicle-Based Telematics Data and Generating User Offerings Responsive to the Vehicle-Based Telematics Data FIG. 6 depicts a flow chart of an exemplary computer-implemented method 600 for processing vehicle-based telematics data and generating user offerings responsive to the vehicle-based telematics data, using computer system 100 shown in FIG. 1. In the exemplary embodiment, method 600 may be performed by user analytics computing device 110 (shown in FIG. 1).

Method 600 may include receiving 602, from a vehicle computing device (e.g., vehicle computing device 104) associated with a first vehicle (e.g., vehicle 102, both shown in FIG. 1), telematics data associated with a plurality of trips taken by a first driver using the first vehicle. Method 600 may also include generating 604 a driver profile of the first driver based at least in part upon the telematics data.

Method 600 may further include accessing 606, from a memory device, contextual data associated with an environment in which the first vehicle travelled during the plurality of trips, and synthesizing 608 the driver profile and the contextual data to generate a contextualized driver profile.

Additionally, method 600 may include, based upon the contextualized driver profile, generating 610 a user offering to influence the driver profile, and transmitting 612 the user offering to a user computing device (e.g., user computing device 108, shown in FIG. 1) associated with the first driver.

Method 600 may include additional, fewer, and/or alternative steps, including those described herein. For example, in some embodiments, generating 610 may include generating the user offering including a recommendation that the first driver reduce a driving speed during at least a portion of one or more future trips. In some embodiments, generating 610 may include generating the user offering including a route recommendation for the first driver, the route recommendation including a route for the first driver to travel and a travel initiation time at which the driver is to initiate travelling along the route.

In some embodiments, accessing 606 may include accessing the contextual data including a posted speed limit along at least one route travelled by the first driver during at least one of the plurality of trips. In some such embodiments, generating 604 may include generating the driver profile including an average speed of the first vehicle during at least a portion of the at least one route travelled by the first driver during the at least one of the plurality of trips. Moreover, synthesizing 608 may include: (a) comparing the average speed of the first vehicle during the portion of the at least one route travelled by the first driver during the at least one of the plurality of trips and the posted speed limit along the at least one route travelled by the first driver during the at least one of the plurality of trips, (b) determining that the first vehicle exceeds the posted speed limit during the portion of the at least one route, and/or (c) generating the contextualized driver profile to include an indicator that the first driver operates the vehicle above the posted speed limit at a location corresponding to the portion of the at least one route. Additionally, generating 910 may include generating the user offering including a recommendation that the first driver reduce a driving speed during one or more future trips at the location indicated in the contextualized driver profile.

In other embodiments, accessing 606 may include accessing the contextual data including at least one of current, average, or predicted traffic data along at least one route travelled by the first driver during a subset of the plurality of trips. In some such embodiments, accessing 606 may further include accessing the contextual data further including traffic light timing data associated with traffic lights disposed along the at least one route travelled by the first driver during the subset of the plurality of trips. Moreover, accessing the contextual data including the traffic light timing data may include accessing sensor data captured by sensors on the first vehicle, the sensor data including at least one of image or video data of the traffic lights. Additionally or alternatively, accessing the contextual data including the traffic light timing data may include accessing the traffic light timing data received from a third party computing device and identifying programmed timing of the traffic lights.

In some such embodiments, synthesizing 608 may include: (a) identifying the at least one route travelled by the first driver during the subset of the plurality of trips as a common route, (b) modelling, using artificial intelligence, historical travel of the first driver along the common route based upon (i) the driver profile, (ii) the at least one of current, average, or predicted traffic data along the common route, and (iii) the traffic light timing data of the traffic lights disposed along the common route, and/or (c) generating the contextualized driver profile to include the modelled historical travel of the first driver. Further, generating 610 may include: (a) modelling, using artificial intelligence, potential travel along the common route based upon (i) the at least one of current, average, or predicted traffic data along the common route, (ii) the traffic light timing data of the traffic lights disposed along the common route, and (iii) the modelled historical travel of the first driver, (b) identifying, based upon the modelled potential travel, a most efficient route that includes at least one of (i) a least number of red lights encountered, (ii) a shortest overall travel time, or (iii) a least amount of time spent stopped in traffic, and a travel initiation time to initiate the most efficient route, and/or (c) generating the user offering to include a route recommendation for the first driver, the route recommendation including the most efficient route with the travel initiation time.

Figure 7:
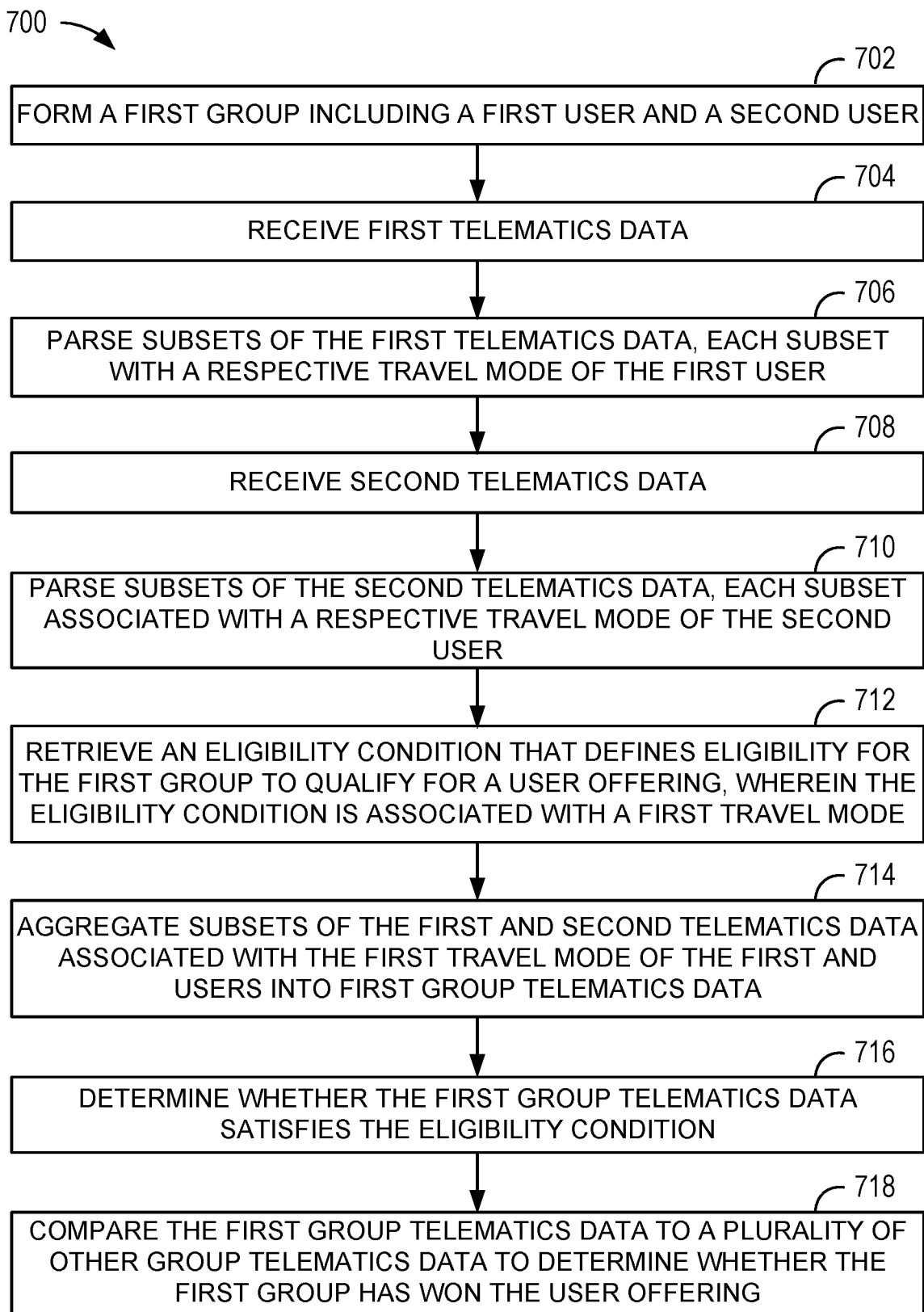
FIG. 7 illustrates a flow chart of an exemplary computer-implemented method for processing mobile device telematics data and generating user offerings responsive to the mobile device telematics data, using the computer system shown in FIG. 1.

Exemplary Computer-Implemented Methods for Processing Mobile Device Telematics Data and Generating User Offerings Responsive to the Mobile Device Telematics Data FIG. 7 depicts a flow chart of an exemplary computer-implemented method 700 for processing mobile device telematics data and generating user offerings responsive to the mobile device telematics data, using computer system 100 shown in FIG. 1. In the exemplary embodiment, method 700 may be performed by user analytics computing device 110 (shown in FIG. 1).

Method 700 may include forming 702 a first group including a first user and a second user. Method 700 may also include receiving 704, from a first mobile device (e.g., user computing device 108, shown in FIG. 1) associated with the first user, first telematics data associated with movement of the first user over a period of time, and parsing 706, from the first telematics data, subsets of the first telematics data, each subset of the first telematics data associated with a respective travel mode of the first user during the period of time.

Method 700 may include receiving 708, from a second mobile device associated with the second user, second telematics data associated with movement of the second user over the period of time, and parsing 710, from the second telematics data, subsets of the second telematics data, each subset of the second telematics data associated with a respective travel mode of the second user during the period of time.

Method 700 may also include retrieving 712 at least one eligibility condition that defines eligibility for the first group to qualify for a user offering, wherein at least one of the eligibility conditions is associated with a first travel mode, aggregating 714 one subset of the first telematics data associated with the first travel mode of the first user and one subset of the second telematics data associated with the first travel mode of the second user into first group telematics data associated with the first travel mode, and determining 716 whether the first group telematics data satisfies the at least one eligibility condition.

Method 700 may further include, when the first group telematics data satisfies the at least one eligibility condition, comparing 718 the first group telematics data to a plurality of other group telematics data associated with a respective plurality of other groups to determine whether the first group has won the user offering.

Method 700 may include additional, fewer, and/or alternative steps, including those described herein. For example, in some embodiments, retrieving 712 may include retrieving the at least one eligibility condition that defines eligibility for the first group to qualify for the user offering including a charitable incentive offered to a charitable organization selected by a winning group of a plurality of groups including the first group and the plurality of other groups.

In some embodiments, aggregating 714 may include aggregating the subsets of first and second telematics data associated with the first travel mode including at least one of walking, jogging, running, riding a bike, using public transportation, carpooling, riding a scooter, or skateboarding.

In other embodiments, aggregating 714 may include aggregating the subsets of first and second telematics data associated with the first travel mode including at least one of walking, jogging, running, riding a bike, using public transportation, carpooling, riding a scooter, skateboarding, or driving a personal vehicle.

In some embodiments, forming 702 may include: (a) receiving a first user-selected charitable organization from the first user, (b) receiving a second user-selected charitable organization from the second user, (c) determining that the first user-selected charitable organization is the same as the second user-selected charitable organization, and/or (d) forming the first group to include the first user and the second user based upon the same user selected charitable organization.

In other embodiments, forming 702 may include receiving a request from at least one of the first user and the second user to join a same group. In some embodiments, method 700 may further include transmitting the at least one eligibility condition to the first user and the second user during the period of time.

In some embodiments, parsing 706 may include executing a trained machine learning model to determine the respective model of travel based upon at least one of a speed of the first user, a pace of the first user, a location of the user during travel, a distance travelled by the user, or a time of travel.

Exemplary Embodiments & Functionality

In one exemplary aspect, a user analytics computing device for processing vehicle-based telematics data and generating user offerings responsive to the vehicle-based telematics data may be provided. The user analytics computing device may include at least one processor (and/or associated transceiver) in communication with a memory device. The at least one processor and/or associated transceiver may be programmed to: (i) receive, from a vehicle computing device associated with a first vehicle, telematics data associated with a plurality of trips taken by a first driver using the first vehicle, (ii) generate a driver profile of the first driver based at least in part upon the telematics data, (iii) access, from the memory device, contextual data associated with an environment in which the first vehicle travelled during the plurality of trips, (iv) synthesize the driver profile and the contextual data to generate a contextualized driver profile, (v) based upon the contextualized driver profile, generate a user offering to influence the driver profile, and/or (vii) transmit the user offering to a user computing device associated with the first driver. The user analytics computing device may include less, additional, and/or alternative functionality, including that described herein.

One enhancement may be, wherein the user offering may include a recommendation that the first driver reduce a driving speed during at least a portion of one or more future trips. Another enhancement may be, wherein the user offering may include a route recommendation for the first driver, the route recommendation including a route for the first driver to travel and a travel initiation time at which the driver is to initiate travelling along the route.

In some embodiments, the contextual data may include a posted speed limit along at least one route travelled by the first driver during at least one of the plurality of trips. The driver profile may include an average speed of the first vehicle during at least a portion of the at least one route travelled by the first driver during the at least one of the plurality of trips. In some such embodiments, to synthesize the driver profile and contextual data, the at least one processor may be further programmed to: (a) compare the average speed of the first vehicle during the portion of the at least one route travelled by the first driver during the at least one of the plurality of trips and the posted speed limit along the at least one route travelled by the first driver during the at least one of the plurality of trips, (b) determine that the first vehicle exceeds the posted speed limit during the portion of the at least one route, and/or (c) generate the contextualized driver profile to include an indicator that the first driver operates the vehicle above the posted speed limit at a location corresponding to the portion of the at least one route. Still further, the user offering may include a recommendation that the first driver reduce a driving speed during one or more future trips at the location indicated in the contextualized driver profile to facilitate and encourage more risk averse driving behavior.

Another enhancement may be, wherein the contextual data may include at least one of current, average, or predicted traffic data along at least one route travelled by the first driver during a subset of the plurality of trips. In some embodiments, the contextual data may further include traffic light timing data associated with traffic lights disposed along the at least one route travelled by the first driver during the subset of the plurality of trips. In some such embodiments, to access the contextual data including the traffic light timing data, the at least one processor may be programmed to access sensor data captured by sensors on the first vehicle, the sensor data including at least one of image or video data of the traffic lights. In other such embodiments, to access the contextual data including the traffic light timing data, the at least one processor may be programmed to access the traffic light timing data received from a third party computing device and identifying programmed timing of the traffic lights.

In some instances, to synthesize the driver profile and contextual data, the at least one processor may be further programmed to: (a) identify the at least one route travelled by the first driver during the subset of the plurality of trips as a common route, (b) model, using artificial intelligence, historical travel of the first driver along the common route based upon (i) the driver profile, (ii) the at least one of current, average, or predicted traffic data along the common route, and (iii) the traffic light timing data of the traffic lights disposed along the common route, and/or (c) generate the contextualized driver profile to include the modelled historical travel of the first driver. In some cases, to generate the user offering, the at least one processor may be further programmed to: (d) model, using artificial intelligence, potential travel along the common route based upon (i) the at least one of current, average, or predicted traffic data along the common route, (ii) the traffic light timing data of the traffic lights disposed along the common route, and (iii) the modelled historical travel of the first driver, (e) identify, based upon the modelled potential travel, a most efficient route that includes at least one of (i) a least number of red lights encountered, (ii) a shortest overall travel time, or (iii) a least amount of time spent stopped in traffic, and a travel initiation time to initiate the most efficient route, and/or (f) generate the user offering to include a route recommendation for the first driver, the route recommendation including the most efficient route with the travel initiation time.

In another exemplary aspect, a computer-implemented method for processing vehicle-based telematics data and generating user offerings responsive to the vehicle-based telematics data may be provided. The method may be implemented by a user analytics computing device including at least one processor (and/or associated transceiver) in communication with a memory device. The method may include, via the at least one processors and/or associated transceiver: (i) receiving, from a vehicle computing device associated with a first vehicle, telematics data associated with a plurality of trips taken by a first driver using the first vehicle, (ii) generating a driver profile of the first driver based at least in part upon the telematics data, (iii) accessing, from the memory device, contextual data associated with an environment in which the first vehicle travelled during the plurality of trips, (iv) synthesizing the driver profile and the contextual data to generate a contextualized driver profile, (v) based upon the contextualized driver profile, generating a user offering to influence the driver profile, and/or (vi) transmitting the user offering to a user computing device associated with the first driver.

One enhancement may be, wherein generating a user offering may include generating the user offering including a recommendation that the first driver reduce a driving speed during at least a portion of one or more future trips. Another enhancement may be, wherein generating a user offering may include generating the user offering including a route recommendation for the first driver, the route recommendation including a route for the first driver to travel and a travel initiation time at which the driver is to initiate travelling along the route.

In some embodiments, accessing contextual data may include accessing the contextual data including a posted speed limit along at least one route travelled by the first driver during at least one of the plurality of trips. In some such embodiments, generating a driver profile may include generating the driver profile including an average speed of the first vehicle during at least a portion of the at least one route travelled by the first driver during the at least one of the plurality of trips. In some instances, synthesizing the driver profile and contextual data may include: (a) comparing the average speed of the first vehicle during the portion of the at least one route travelled by the first driver during the at least one of the plurality of trips and the posted speed limit along the at least one route travelled by the first driver during the at least one of the plurality of trips, (b) determining that the first vehicle exceeds the posted speed limit during the portion of the at least one route, and/or (c) generating the contextualized driver profile to include an indicator that the first driver operates the vehicle above the posted speed limit at a location corresponding to the portion of the at least one route. Further, generating a user offering may include generating the user offering including a recommendation that the first driver reduce a driving speed during one or more future trips at the location indicated in the contextualized driver profile to facilitate and encourage more risk averse driving behavior.

Another enhancement may be, wherein accessing contextual data may include accessing the contextual data including at least one of current, average, or predicted traffic data along at least one route travelled by the first driver during a subset of the plurality of trips. In some embodiments, accessing the contextual data further may include accessing the contextual data further including traffic light timing data associated with traffic lights disposed along the at least one route travelled by the first driver during the subset of the plurality of trips. In other embodiments, accessing the contextual data including the traffic light timing data may include accessing sensor data captured by sensors on the first vehicle, the sensor data including at least one of image or video data of the traffic lights.

In some instances, accessing the contextual data including the traffic light timing data may include accessing the traffic light timing data received from a third party computing device and identifying programmed timing of the traffic lights. In some embodiments, synthesizing the driver profile and contextual data may include (a) identifying the at least one route travelled by the first driver during the subset of the plurality of trips as a common route, (b) modelling, using artificial intelligence, historical travel of the first driver along the common route based upon (i) the driver profile, (ii) the at least one of current, average, or predicted traffic data along the common route, and (iii) the traffic light timing data of the traffic lights disposed along the common route, and/or (c) generating the contextualized driver profile to include the modelled historical travel of the first driver. Further, generating the user offering may include: (d) modelling, using artificial intelligence, potential travel along the common route based upon (i) the at least one of current, average, or predicted traffic data along the common route, (ii) the traffic light timing data of the traffic lights disposed along the common route, and (iii) the modelled historical travel of the first driver, (e) identifying, based upon the modelled potential travel, a most efficient route that includes at least one of (i) a least number of red lights encountered, (ii) a shortest overall travel time, or (iii) a least amount of time spent stopped in traffic, and a travel initiation time to initiate the most efficient route, and/or (f) generating the user offering to include a route recommendation for the first driver, the route recommendation including the most efficient route with the travel initiation time.

In a further exemplary aspect, a non-transitory computer-readable storage medium having computer-executable instructions embodied thereon may be provided. When executed by a user analytics computing device having at least one processor (and/or associated transceiver) in communication with at least one memory, the computer-executable instructions may cause the at least one processor and/or associated transceiver to: (i) receive, from a vehicle computing device associated with a first vehicle, telematics data associated with a plurality of trips taken by a first driver using the first vehicle, (ii) generate a driver profile of the first driver based at least in part upon the telematics data, (iii) access, from the memory device, contextual data associated with an environment in which the first vehicle travelled during the plurality of trips, (iv) synthesize the driver profile and the contextual data to generate a contextualized driver profile, (v) based upon the contextualized driver profile, generate a user offering to influence the driver profile, and/or (vi) transmit the user offering to a user computing device associated with the first driver.

One enhancement may be, wherein the user offering may include a recommendation that the first driver reduce a driving speed during at least a portion of one or more future trips. Another enhancement may be, wherein the user offering may include a route recommendation for the first driver, the route recommendation including a route for the first driver to travel and a travel initiation time at which the driver is to initiate travelling along the route.

In some embodiments, the contextual data may include a posted speed limit along at least one route travelled by the first driver during at least one of the plurality of trips. The driver profile may include an average speed of the first vehicle during at least a portion of the at least one route travelled by the first driver during the at least one of the plurality of trips. In some such embodiments, to synthesize the driver profile and contextual data, the computer-executable instructions may cause at least one processor to: (a) compare the average speed of the first vehicle during the portion of the at least one route travelled by the first driver during the at least one of the plurality of trips and the posted speed limit along the at least one route travelled by the first driver during the at least one of the plurality of trips, (b) determine that the first vehicle exceeds the posted speed limit during the portion of the at least one route, and/or (c) generate the contextualized driver profile to include an indicator that the first driver operates the vehicle above the posted speed limit at a location corresponding to the portion of the at least one route. Still further, the user offering may include a recommendation that the first driver reduce a driving speed during one or more future trips at the location indicated in the contextualized driver profile to facilitate and encourage more risk averse driving behavior.

Another enhancement may be, wherein the contextual data may include at least one of current, average, or predicted traffic data along at least one route travelled by the first driver during a subset of the plurality of trips. In some embodiments, the contextual data may further include traffic light timing data associated with traffic lights disposed along the at least one route travelled by the first driver during the subset of the plurality of trips. In some such embodiments, to access the contextual data including the traffic light timing data, the computer-executable instructions may cause at least one processor to access sensor data captured by sensors on the first vehicle, the sensor data including at least one of image or video data of the traffic lights. In other such embodiments, the computer-executable instructions may cause at least one processor to access the traffic light timing data received from a third party computing device and identifying programmed timing of the traffic lights.

In some instances, to synthesize the driver profile and contextual data, the computer-executable instructions may cause at least one processor to: (a) identify the at least one route travelled by the first driver during the subset of the plurality of trips as a common route, (b) model, using artificial intelligence, historical travel of the first driver along the common route based upon (i) the driver profile, (ii) the at least one of current, average, or predicted traffic data along the common route, and (iii) the traffic light timing data of the traffic lights disposed along the common route, and/or (c) generate the contextualized driver profile to include the modelled historical travel of the first driver. In some cases, to generate the user offering, the computer-executable instructions may cause at least one processor to: (d) model, using artificial intelligence, potential travel along the common route based upon (i) the at least one of current, average, or predicted traffic data along the common route, (ii) the traffic light timing data of the traffic lights disposed along the common route, and (iii) the modelled historical travel of the first driver, (e) identify, based upon the modelled potential travel, a most efficient route that includes at least one of (i) a least number of red lights encountered, (ii) a shortest overall travel time, or (iii) a least amount of time spent stopped in traffic, and a travel initiation time to initiate the most efficient route, and/or (f) generate the user offering to include a route recommendation for the first driver, the route recommendation including the most efficient route with the travel initiation time.

In yet another exemplary aspect, a user analytics computing device for processing mobile device telematics data and generating user offerings responsive to the mobile device telematics data may be provided. The user analytics computing device may include at least one processor (and/or associated transceiver) in communication with a memory device. The at least one processor and/or associated transceiver may be programmed to: (i) form a first group including a first user and a second user, (ii) receive, from a first mobile device associated with the first user, first telematics data associated with movement of the first user over a period of time, (iii) parse, from the first telematics data, subsets of the first telematics data, each subset of the first telematics data associated with a respective travel mode of the first user during the period of time, (iv) receive, from a second mobile device associated with the second user, second telematics data associated with movement of the second user over the period of time, (v) parse, from the second telematics data, subsets of the second telematics data, each subset of the second telematics data associated with a respective travel mode of the second user during the period of time, (vi) retrieve at least one eligibility condition that defines eligibility for the first group to qualify for a user offering, wherein at least one of the eligibility conditions is associated with a first travel mode, (vii) aggregate one subset of the first telematics data associated with the first travel mode of the first user and one subset of the second telematics data associated with the first travel mode of the second user into first group telematics data associated with the first travel mode, (viii) determine whether the first group telematics data satisfies the at least one eligibility condition, and/or (ix) when the first group telematics data satisfies the at least one eligibility condition, compare the first group telematics data to a plurality of other group telematics data associated with a respective plurality of other groups to determine whether the first group has won the user offering.

One enhancement may be, wherein the user offering may be a charitable incentive offered to a charitable organization selected by a winning group of a plurality of groups including the first group and the plurality of other groups.

Another enhancement may be, wherein the first travel mode may be at least one of walking, jogging, running, riding a bike, using public transportation, carpooling, riding a scooter, or skateboarding.

A further enhancement may be, wherein the first travel mode may be at least one of walking, jogging, running, riding a bike, using public transportation, carpooling, riding a scooter, skateboarding, or driving a personal vehicle.

In some embodiments, to form the first group, the at least one processor may be further programmed to: (a) receive a first user-selected charitable organization from the first user, (b) receive a second user-selected charitable organization from the second user, (c) determine that the first user-selected charitable organization is the same as the second user-selected charitable organization, and/or (d) form the first group to include the first user and the second user based upon the same user selected charitable organization.

In other embodiments, to form the first group, the at least one processor may be further programmed to receive a request from at least one of the first user and the second user to join a same group.

One enhancement may be, wherein the at least one processor may be further programmed to transmit the at least one eligibility condition to the first user and the second user during the period of time.

Another enhancement may be, wherein the at least one processor may be further programmed to parse the subsets of the first telematics data by executing a trained machine learning model to determine the respective model of travel based upon at least one of a speed of the first user, a pace of the first user, a location of the user during travel, a distance travelled by the user, or a time of travel.

In another exemplary aspect, a computer-implemented method for processing mobile device telematics data and generating user offerings responsive to the mobile device telematics data may be provided. The method may be implemented using a user analytics computing device including at least one processor (and/or associated transceiver) in communication with a memory device. The method may include, via the at least one processor and/or associated transceiver: (i) forming a first group including a first user and a second user, (ii) receiving, from a first mobile device associated with the first user, first telematics data associated with movement of the first user over a period of time, (iii) parsing, from the first telematics data, subsets of the first telematics data, each subset of the first telematics data associated with a respective travel mode of the first user during the period of time, (iv) receiving, from a second mobile device associated with the second user, second telematics data associated with movement of the second user over the period of time, (v) parsing, from the second telematics data, subsets of the second telematics data, each subset of the second telematics data associated with a respective travel mode of the second user during the period of time, (vi) retrieving at least one eligibility condition that defines eligibility for the first group to qualify for a user offering, wherein at least one of the eligibility conditions is associated with a first travel mode, (vii) aggregating one subset of the first telematics data associated with the first travel mode of the first user and one subset of the second telematics data associated with the first travel mode of the second user into first group telematics data associated with the first travel mode, (viii) determining whether the first group telematics data satisfies the at least one eligibility condition, and/or (ix) when the first group telematics data satisfies the at least one eligibility condition, comparing the first group telematics data to a plurality of other group telematics data associated with a respective plurality of other groups to determine whether the first group has won the user offering.

One enhancement may be, wherein retrieving at least one eligibility condition that defines eligibility for the first group to qualify for a user offering may include retrieving the at least one eligibility condition that defines eligibility for the first group to qualify for the user offering including a charitable incentive offered to a charitable organization selected by a winning group of a plurality of groups including the first group and the plurality of other groups.

Another enhancement may be, wherein aggregating one subset of the first telematics data associated with the first travel mode of the first user and one subset of the second telematics data associated with the first travel mode of the second user may include aggregating the subsets of first and second telematics data associated with the first travel mode including at least one of walking, jogging, running, riding a bike, using public transportation, carpooling, riding a scooter, or skateboarding.

A further enhancement may be, wherein aggregating one subset of the first telematics data associated with the first travel mode of the first user and one subset of the second telematics data associated with the first travel mode of the second user may include aggregating the subsets of first and second telematics data associated with the first travel mode including at least one of walking, jogging, running, riding a bike, using public transportation, carpooling, riding a scooter, skateboarding, or driving a personal vehicle.

In some embodiments, forming the first group may include: (a) receiving a first user-selected charitable organization from the first user, (b) receiving a second user-selected charitable organization from the second user, (c) determining that the first user-selected charitable organization is the same as the second user-selected charitable organization, and/or (d) forming the first group to include the first user and the second user based upon the same user selected charitable organization.

In some embodiments, forming the first group may include receiving a request from at least one of the first user and the second user to join a same group.

One enhancement may be, the method may further include transmitting the at least one eligibility condition to the first user and the second user during the period of time.

Another enhancement may be, the method may further include parsing the subsets of the first telematics data by executing a trained machine learning model to determine the respective model of travel based upon at least one of a speed of the first user, a pace of the first user, a location of the user during travel, a distance travelled by the user, or a time of travel.

In a further exemplary aspect, a non-transitory computer-readable storage medium having computer-executable instructions embodied thereon may be provided. When executed by a user analytics computing device having at least one processor (and/or associated transceiver) in communication with at least one memory, the computer-executable instructions may cause the at least one processor and/or associated transceiver to: (i) form a first group including a first user and a second user, (ii) receive, from a first mobile device associated with the first user, first telematics data associated with movement of the first user over a period of time, (iii) parse, from the first telematics data, subsets of the first telematics data, each subset of the first telematics data associated with a respective travel mode of the first user during the period of time, (iv) receive, from a second mobile device associated with the second user, second telematics data associated with movement of the second user over the period of time, (v) parse, from the second telematics data, subsets of the second telematics data, each subset of the second telematics data associated with a respective travel mode of the second user during the period of time, (vi) retrieve at least one eligibility condition that defines eligibility for the first group to qualify for a user offering, wherein at least one of the eligibility conditions is associated with a first travel mode, (vii) aggregate one subset of the first telematics data associated with the first travel mode of the first user and one subset of the second telematics data associated with the first travel mode of the second user into first group telematics data associated with the first travel mode, (viii) determine whether the first group telematics data satisfies the at least one eligibility condition, and/or (ix) when the first group telematics data satisfies the at least one eligibility condition, compare the first group telematics data to a plurality of other group telematics data associated with a respective plurality of other groups to determine whether the first group has won the user offering.

One enhancement may be, wherein the user offering may be a charitable incentive offered to a charitable organization selected by a winning group of a plurality of groups including the first group and the plurality of other groups.

Another enhancement may be, wherein the first travel mode may be at least one of walking, jogging, running, riding a bike, using public transportation, carpooling, riding a scooter, or skateboarding.

A further enhancement may be, wherein the first travel mode may be at least one of walking, jogging, running, riding a bike, using public transportation, carpooling, riding a scooter, skateboarding, or driving a personal vehicle.

In some embodiments, to form the first group, the computer-executable instructions may cause the at least one processor to: (a) receive a first user-selected charitable organization from the first user, (b) receive a second user-selected charitable organization from the second user, (c) determine that the first user-selected charitable organization is the same as the second user-selected charitable organization, and/or (d) form the first group to include the first user and the second user based upon the same user selected charitable organization.

In other embodiments, to form the first group, the computer-executable instructions may cause the at least one processor to receive a request from at least one of the first user and the second user to join a same group.

One enhancement may be, wherein the computer-executable instructions may cause the at least one processor to transmit the at least one eligibility condition to the first user and the second user during the period of time.

Another enhancement may be, wherein the computer-executable instructions may cause the at least one processor to parse the subsets of the first telematics data by executing a trained machine learning model to determine the respective model of travel based upon at least one of a speed of the first user, a pace of the first user, a location of the user during travel, a distance travelled by the user, or a time of travel.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as historical traffic data, trip data, weather data, event data, and the like. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract trends and/or patterns in user behavior, relative to contextual data, that may then be used to generate intelligent user offerings.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A user analytics computing device for processing vehicle-based telematics data and generating user offerings responsive to the vehicle-based telematics data, the user analytics computing device comprising at least one processor in communication with a memory device, the at least one processor programmed to:

receive, from a vehicle computing device associated with a first vehicle, historical telematics data associated with a plurality of historical trips taken by a first driver using the first vehicle;

generate a driver profile of the first driver based at least in part upon the historical telematics data;

access, from the memory device, contextual data associated with an environment in which the first vehicle travelled during the plurality of historical trips;

synthesize the driver profile and the contextual data to generate a contextualized driver profile, wherein the contextualized driver profile includes (i) metrics associated with driving behavior of the first driver within the environment and (ii) models associated with common routes driven by the first driver;

based upon the contextualized driver profile, generate a user offering to influence the driver profile;

transmit the user offering to a user computing device associated with the first driver;

cause to be displayed on the user computing device the user offering including an indication of adverse driving behavior of the first driver affecting the driver profile and an incentive if the adverse driving behavior is corrected; and after the user offering is transmitted:
receive, from the vehicle computing device, current telematics data associated with current trips taken by the first driver using the first vehicle;
analyze the current telematics data to determine whether the adverse driving behavior has been corrected; and
in response to determining that the adverse driving behavior has been corrected, transmit, to the user computing device, a confirmation message indicating that the first driver has earned the incentive.

2. The user analytics computing device of claim 1, wherein the user offering includes a recommendation that the first driver reduce a driving speed during at least a portion of one or more future trips.

3. The user analytics computing device of claim 1, wherein the user offering includes a route recommendation for the first driver, the route recommendation including a route for the first driver to travel and a travel initiation time at which the first driver is to initiate travelling along the route.

4. The user analytics computing device of claim 1, wherein the contextual data includes a posted speed limit along at least one route travelled by the first driver during at least one of the plurality of historical trips.

5. The user analytics computing device of claim 4, wherein the driver profile includes an average speed of the first vehicle during at least a portion of the at least one route travelled by the first driver during the at least one of the plurality of historical trips.

6. The user analytics computing device of claim 5, wherein to synthesize the driver profile and the contextual data, the at least one processor is further programmed to:
compare the average speed of the first vehicle during the portion of the at least one route travelled by the first driver during the at least one of the plurality of historical trips and the posted speed limit along the at least one route travelled by the first driver during the at least one of the plurality of historical trips;
determine that the first vehicle exceeds the posted speed limit during the portion of the at least one route; and
update the contextualized driver profile to include an indicator that the first driver operates the first vehicle above the posted speed limit at a location corresponding to the portion of the at least one route.

7. The user analytics computing device of claim 6, wherein the user offering includes a recommendation that the first driver reduce a driving speed during one or more future trips at the location indicated in the contextualized driver profile.

8. The user analytics computing device of claim 1, wherein the contextual data includes at least one of current, average, or predicted traffic data along at least one route travelled by the first driver during a subset of the plurality of historical trips.

9. The user analytics computing device of claim 8, wherein the contextual data further includes traffic light timing data associated with traffic lights disposed along the at least one route travelled by the first driver during the subset of the plurality of historical trips.

10. The user analytics computing device of claim 9, wherein to access the contextual data including the traffic light timing data, the at least one processor is programmed to access sensor data captured by sensors on the first vehicle, the sensor data including at least one of image or video data of the traffic lights.

11. The user analytics computing device of claim 9, wherein to access the contextual data including the traffic light timing data, the at least one processor is programmed to access the traffic light timing data received from a third party computing device and identifying programmed timing of the traffic lights.

12. The user analytics computing device of claim 9, wherein to synthesize the driver profile and the contextual data, the at least one processor is further programmed to:
identify the at least one route travelled by the first driver during the subset of the plurality of historical trips as a common route;
model, using artificial intelligence, historical travel of the first driver along the common route based upon (i) the driver profile, (ii) the at least one of current, average, or predicted traffic data along the common route, and (iii) the traffic light timing data of the traffic lights disposed along the common route; and
update the contextualized driver profile to include the modelled historical travel of the first driver.

13. The user analytics computing device of claim 12, wherein to generate the user offering, the at least one processor is further programmed to:
model, using artificial intelligence, potential travel along the common route based upon (i) the at least one of current, average, or predicted traffic data along the common route, (ii) the traffic light timing data of the traffic lights disposed along the common route, and (iii) the modelled historical travel of the first driver;
identify, based upon the modelled potential travel, a most efficient route that includes at least one of (i) a least number of red lights encountered, (ii) a shortest overall travel time, or (iii) a least amount of time spent stopped in traffic, and a travel initiation time to initiate the most efficient route; and
generate the user offering to include a route recommendation for the first driver, the route recommendation including the most efficient route with the travel initiation time.

14. A computer-implemented method for processing vehicle-based telematics data and generating user offerings responsive to the vehicle-based telematics data, the method implemented by a user analytics computing device including at least one processor in communication with a memory device, the method comprising:
- receiving, from a vehicle computing device associated with a first vehicle, historical telematics data associated with a plurality of historical trips taken by a first driver using the first vehicle;
- generating a driver profile of the first driver based at least in part upon the historical telematics data;
- accessing, from the memory device, contextual data associated with an environment in which the first vehicle travelled during the plurality of historical trips;
- synthesizing the driver profile and the contextual data to generate a contextualized driver profile, wherein the contextualized driver profile includes at least one of (i) metrics associated with driving behavior of the first driver within the environment and (ii) models associated with common routes driven by the first driver;
- based upon the contextualized driver profile, generating a user offering to influence the driver profile;
- transmitting the user offering to a user computing device associated with the first driver;
- causing to be displayed on the user computing device the user offering including an indication of adverse driving behavior of the first driver affecting the driver profile and an incentive if the adverse driving behavior is corrected; and
- after the user offering is transmitted:
  - receiving, from the vehicle computing device, current telematics data associated with current trips taken by the first driver using the first vehicle;
  - analyzing the current telematics data to determine whether the adverse driving behavior has been corrected; and
  - in response to determining that the adverse driving behavior has been corrected, transmitting, to the user computing device, a confirmation message indicating that the first driver has earned the incentive.

15. The computer-implemented method of claim 14, wherein generating a user offering comprises generating the user offering including a recommendation that the first driver reduce a driving speed during at least a portion of one or more future trips.

16. The computer-implemented method of claim 14, wherein generating a user offering comprises generating the user offering including a route recommendation for the first driver, the route recommendation including a route for the first driver to travel and a travel initiation time at which the first driver is to initiate travelling along the route.

17. The computer-implemented method of claim 14, wherein accessing the contextual data comprises accessing the contextual data including a posted speed limit along at least one route travelled by the first driver during at least one of the plurality of historical trips.

18. The computer-implemented method of claim 17, wherein generating the driver profile comprises generating the driver profile including an average speed of the first vehicle during at least a portion of the at least one route travelled by the first driver during the at least one of the plurality of historical trips.

19. The computer-implemented method of claim 18, wherein synthesizing the driver profile and the contextual data comprises:
- comparing the average speed of the first vehicle during the portion of the at least one route travelled by the first driver during the at least one of the plurality of historical trips and the posted speed limit along the at least one route travelled by the first driver during the at least one of the plurality of historical trips;
- determining that the first vehicle exceeds the posted speed limit during the portion of the at least one route; and
- updating the contextualized driver profile to include an indicator that the first driver operates the first vehicle above the posted speed limit at a location corresponding to the portion of the at least one route.

20. A non-transitory computer-readable storage medium having computer-executable instructions embodied thereon, when executed by a user analytics computing device having at least one processor in communication with at least one memory device, the computer-executable instructions cause the at least one processor to:
- receive, from a vehicle computing device associated with a first vehicle, historical telematics data associated with a plurality of historical trips taken by a first driver using the first vehicle;
- generate a driver profile of the first driver based at least in part upon the historical telematics data;
- access, from the memory device, contextual data associated with an environment in which the first vehicle travelled during the plurality of historical trips;
- synthesize the driver profile and the contextual data to generate a contextualized driver profile, wherein the contextualized driver profile includes at least one of (i) metrics associated with driving behavior of the first driver within the environment and (ii) models associated with common routes driven by the first driver;
- based upon the contextualized driver profile, generate a user offering to influence the driver profile;
- transmit the user offering to a user computing device associated with the first driver;
- cause to be displayed on the user computing device the user offering including an indication of adverse driving behavior of the first driver affecting the driver profile and an incentive if the adverse driving behavior is corrected; and
- after the user offering is transmitted:
  - receive, from the vehicle computing device, current telematics data associated with current trips taken by the first driver using the first vehicle;
  - analyze the current telematics data to determine whether the adverse driving behavior has been corrected; and
  - in response to determining that the adverse driving behavior has been corrected, transmit, to the user computing device, a confirmation message indicating that the first driver has earned the incentive.

* * * * *